US009279487B1

(12) United States Patent
Guglietti

(10) Patent No.: US 9,279,487 B1
(45) Date of Patent: Mar. 8, 2016

(54) BALL SCREW AND PARTS

(76) Inventor: David B. Guglietti, Sterling Heights, MI (US)

( * ) Notice: Subject to any disclaimer, the term of this patent is extended or adjusted under 35 U.S.C. 154(b) by 343 days.

(21) Appl. No.: 13/136,598

(22) Filed: Aug. 4, 2011

Related U.S. Application Data

(63) Continuation-in-part of application No. 12/924,503, filed on Sep. 28, 2010, now Pat. No. 9,062,748.

(60) Provisional application No. 61/400,979, filed on Aug. 5, 2010, provisional application No. 61/277,799, filed on Sep. 30, 2009.

(51) Int. Cl.
*F16H 25/22* (2006.01)
*F16H 25/20* (2006.01)
*F16H 25/24* (2006.01)

(52) U.S. Cl.
CPC ........ *F16H 25/2006* (2013.01); *F16H 25/2204* (2013.01); *F16H 25/2209* (2013.01); *F16H 25/2418* (2013.01); *Y10T 74/18712* (2015.01); *Y10T 74/18728* (2015.01); *Y10T 74/19749* (2015.01)

(58) Field of Classification Search
CPC . F16H 25/24; F16H 25/2418; F16H 25/2204; F16H 25/2209; F16H 25/2006
USPC ............... 74/454.82, 424.83, 424.84, 424.86, 74/89.3, 89.42
See application file for complete search history.

(56) References Cited

U.S. PATENT DOCUMENTS

| | | | |
|---|---|---|---|
| 477,642 A | 6/1892 | Brunthaver | 74/424.82 |
| 611,832 A | 10/1898 | Coughlan | 74/424.82 |
| 1,704,031 A | 3/1929 | Boehm | 74/424.82 |
| 1,746,978 A * | 2/1930 | Winkler | F16C 25/08 192/111.1 |
| 2,076,180 A * | 4/1937 | Griswold | 384/451 |
| 2,380,662 A | 7/1945 | Means, Jr. | 74/424.86 |
| 3,053,105 A | 9/1962 | Cole | 74/424.81 |
| 3,059,494 A | 10/1962 | Grabowski et al. | 74/441 |
| 3,124,969 A * | 3/1964 | Grabowski | 74/441 |
| 3,186,249 A * | 6/1965 | Lanzenberger | B23Q 5/56 74/409 |
| 3,498,651 A | 3/1970 | Peterson | 403/355 |
| 3,669,460 A * | 6/1972 | Wysong | 277/354 |
| 3,678,776 A | 7/1972 | Patterson | |
| 4,008,625 A | 2/1977 | Malhotra | 74/441 |
| 4,052,076 A * | 10/1977 | Wysong | 277/354 |
| 4,225,124 A * | 9/1980 | Pollak | B23B 31/19 269/196 |
| 4,369,011 A * | 1/1983 | Ploss | 411/223 |

(Continued)

OTHER PUBLICATIONS

Guglietti. U.S. Appl. No. 61/400,979, filed Aug. 5, 2010 A.D.

(Continued)

*Primary Examiner* — William Kelleher
*Assistant Examiner* — Emily Cheng
(74) *Attorney, Agent, or Firm* — Christopher John Rudy

(57) ABSTRACT

Double nut is capable of adjustment in a ball screw unit so as to regulate tension between the nut and the ball screw with their ball bearings such as to avoid or repair backlash in or maintain precision with the unit. The adjustment may be made without removal of the ball screw unit from a machine in which it operates or automatically. The double nut can be employed with or in methods of making, repair or adjustment of, and manufacturing with the ball screw unit with such a nut. A wiping contrivance for a ball screw nut or unit can be a member in annular form, and made and used in aspects analogous to those of the double nut. A depending foot, ball bearing return may be employed in a ball screw nut or unit in aspects analogous to those of the double nut.

29 Claims, 30 Drawing Sheets

(56) References Cited

U.S. PATENT DOCUMENTS

| | | | | |
|---|---|---|---|---|
| 4,487,087 | A | 12/1984 | Johnstone | 74/424.8 |
| 4,638,548 | A | 1/1987 | Miller | 29/558 |
| 4,643,041 | A | 2/1987 | Benton | 74/441 |
| 4,669,324 | A | 6/1987 | DeMey et al. | 74/89.23 |
| 4,677,869 | A * | 7/1987 | Mayfield | 74/424.83 |
| 4,760,635 | A | 8/1988 | Miller | 29/558 |
| 4,795,172 | A * | 1/1989 | Brande | 277/354 |
| 4,827,789 | A | 5/1989 | Hallidy et al. | 74/89.27 |
| 4,953,419 | A | 9/1990 | Schlenker | 74/459 |
| 5,063,809 | A | 11/1991 | Schlenker | 74/459 |
| 5,193,409 | A | 3/1993 | Babinski | 74/424.83 |
| 5,467,661 | A | 11/1995 | Lange | 74/441 |
| 5,483,929 | A * | 1/1996 | Kuhn et al. | 123/90.1 |
| 5,493,929 | A | 2/1996 | Namimatsu et al. | 74/424.82 |
| 5,501,118 | A | 3/1996 | Benton | 74/441 |
| 5,582,072 | A | 12/1996 | Yamaguchi et al. | 74/441 |
| 5,653,145 | A | 8/1997 | Kobayashi et al. | 74/459 |
| 5,697,252 | A | 12/1997 | Yamaguchi et al. | 74/441 |
| 5,791,192 | A | 8/1998 | Lee | 74/459 |
| 5,911,789 | A | 6/1999 | Keipert et al. | 74/493 |
| 6,082,209 | A | 7/2000 | Yabe et al. | 74/424.83 |
| 6,119,541 | A * | 9/2000 | Robinson | 74/441 |
| 6,142,032 | A | 11/2000 | Creager | 74/441 |
| 6,158,720 | A * | 12/2000 | Patrick et al. | 254/103 |
| 6,176,149 | B1 | 1/2001 | Misu | 74/459 |
| 6,425,302 | B2 | 7/2002 | Greubel | 74/424.87 |
| 6,446,520 | B1 | 9/2002 | Nagai et al. | 74/89.33 |
| 6,732,599 | B2 * | 5/2004 | Michioka et al. | 74/89.4 |
| 6,928,895 | B2 | 8/2005 | Davies et al. | 74/89.26 |
| 6,931,955 | B2 * | 8/2005 | Yatsushiro et al. | 74/89.4 |
| 7,337,688 | B2 | 3/2008 | Husistein | 74/89.42 |
| 7,363,835 | B2 | 4/2008 | Ohkubo et al. | 74/424.86 |
| 7,482,395 | B2 | 1/2009 | Mabey et al. | |
| 7,506,557 | B2 | 3/2009 | Hosokai et al. | 74/89.42 |
| 7,516,681 | B2 | 4/2009 | Hsu | 74/424.81 |
| 7,520,193 | B2 | 4/2009 | Chen | 74/424.87 |
| 7,523,681 | B2 | 4/2009 | Pan et al. | 74/424.82 |
| 7,523,682 | B2 | 4/2009 | Liao et al. | 74/424.87 |
| 7,562,596 | B2 | 7/2009 | Chen | 74/89.42 |
| 7,975,413 | B1 | 7/2011 | Baryla, Sr. | |
| 8,127,586 | B1 | 3/2012 | Gunst | |
| 2002/0026844 | A1 | 3/2002 | Fujita | 74/424.86 |
| 2003/0172759 | A1 | 9/2003 | Hayashi | 74/424.86 |
| 2004/0000208 | A1 | 1/2004 | Michioka et al. | 74/424.86 |
| 2006/0137485 | A1 | 6/2006 | Ohkubo | 74/424.87 |
| 2007/0186708 | A1 | 8/2007 | Liao et al. | 74/424.86 |
| 2007/0295128 | A1 * | 12/2007 | Erikson et al. | 74/89.42 |
| 2008/0053260 | A1 | 3/2008 | Liao et al. | 74/424.87 |
| 2008/0134822 | A1 | 6/2008 | Pan et al. | 74/424.87 |
| 2008/0190231 | A1 | 8/2008 | Chiu et al. | 74/424.86 |
| 2009/0013811 | A1 | 1/2009 | Hsu | 74/424.87 |
| 2009/0107273 | A1 | 4/2009 | Chen et al. | 74/424.86 |
| 2009/0158873 | A1 | 6/2009 | Wu et al. | 74/424.86 |
| 2010/0232014 | A1 * | 9/2010 | Huang | F16H 25/2006 359/399 |

OTHER PUBLICATIONS

Guglietti et al., U.S. Appl. No. 12/924,503, filed Sep. 28, 2010 A.D.
Guglietti et al., U.S. Appl. No. 61/277,799, filed Sep. 30, 2009 A.D.
European Ball Screw Double Nut, ca. 1995-2000, with sketches by David B. Guglietti, Apr. 9, 2015 A.D., 1 sheet.

* cited by examiner

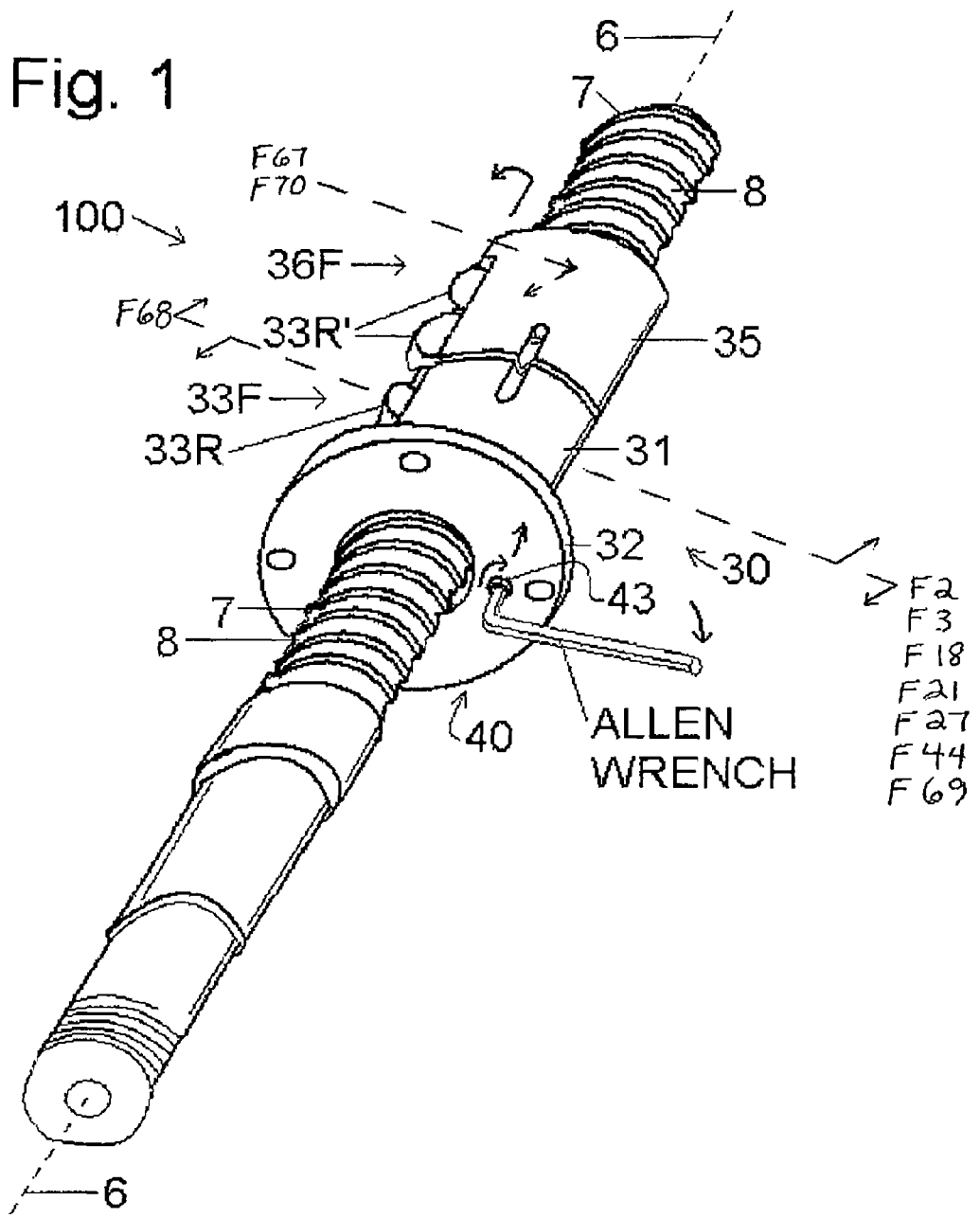

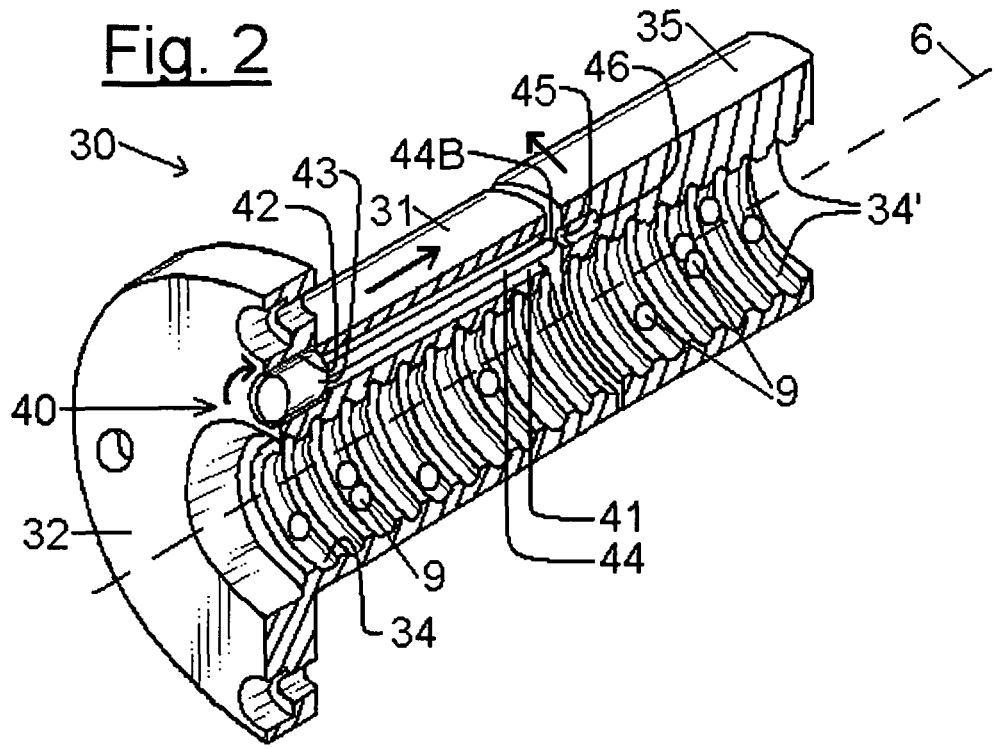
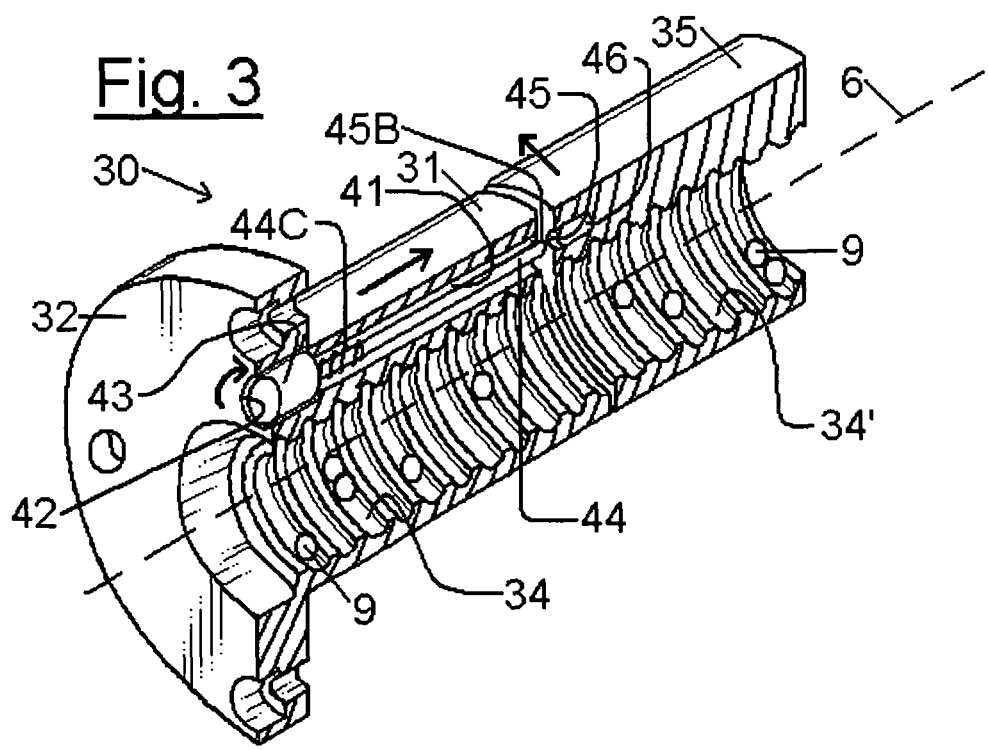

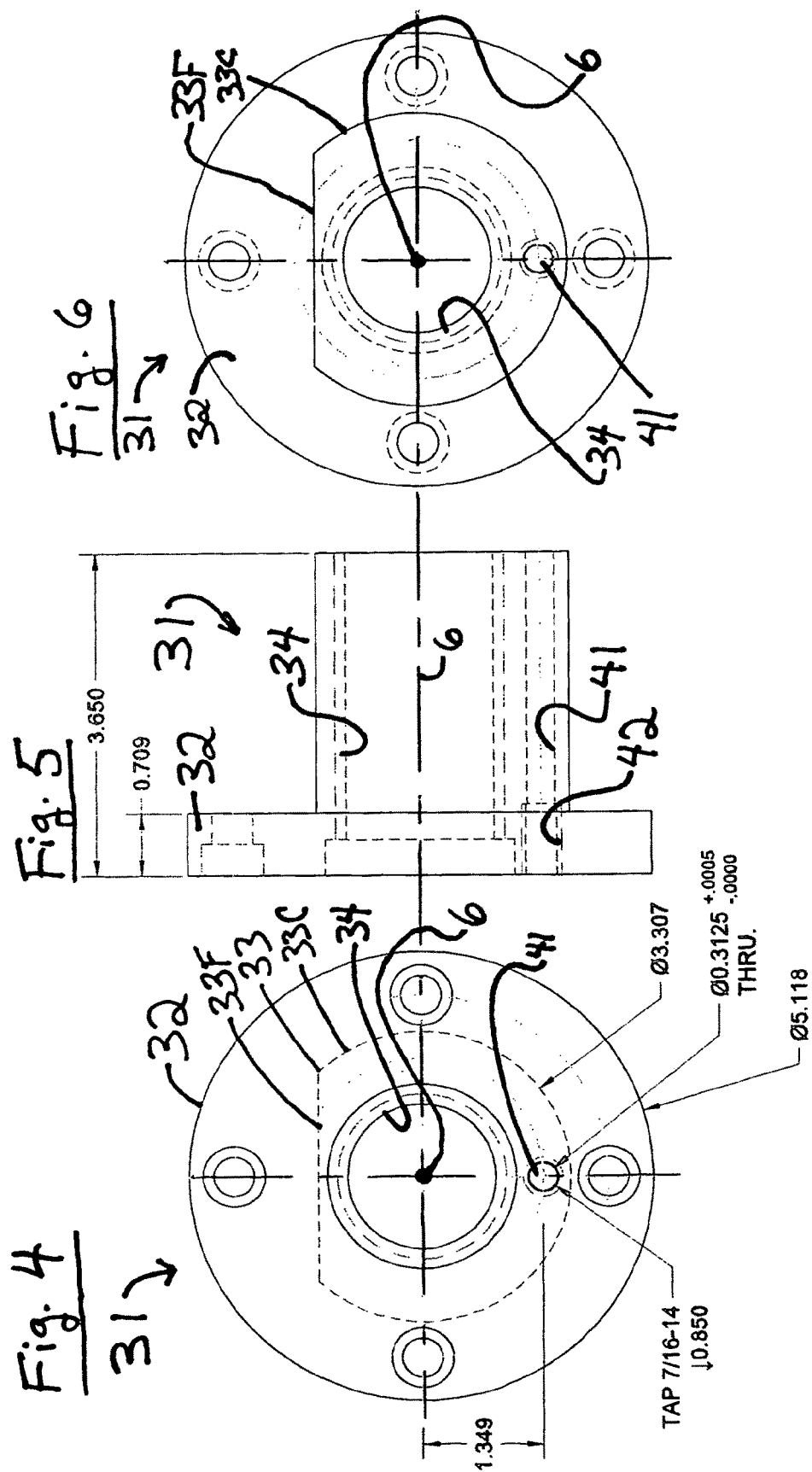

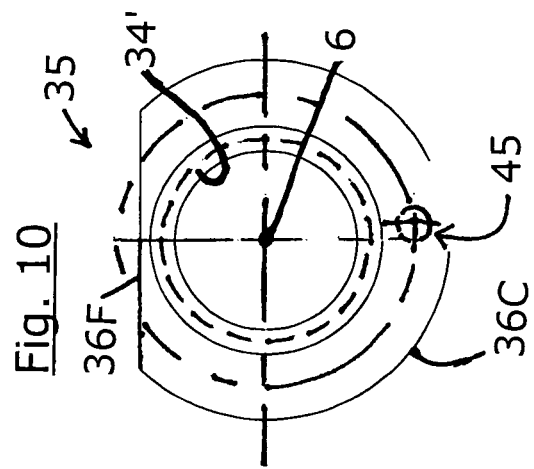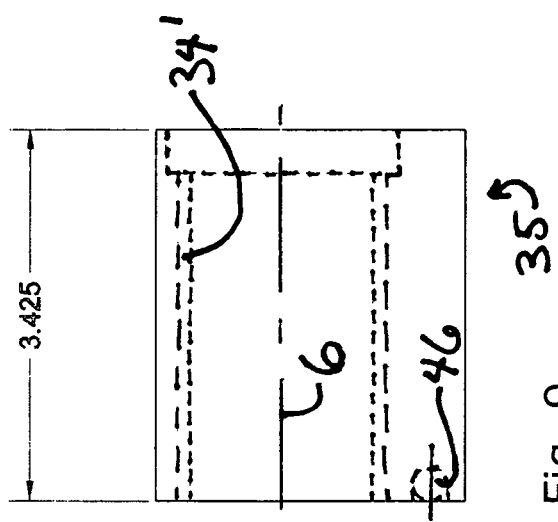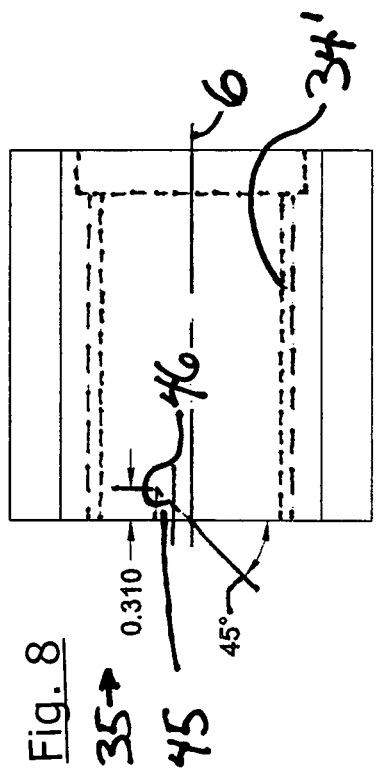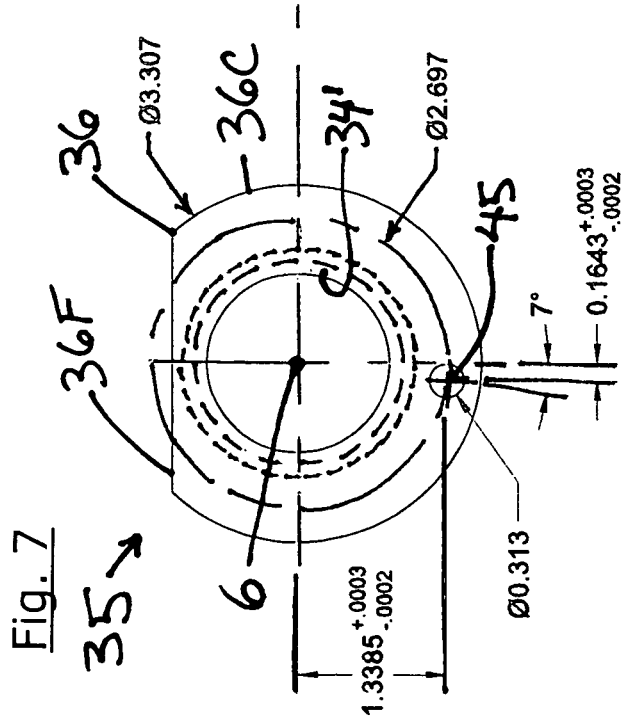

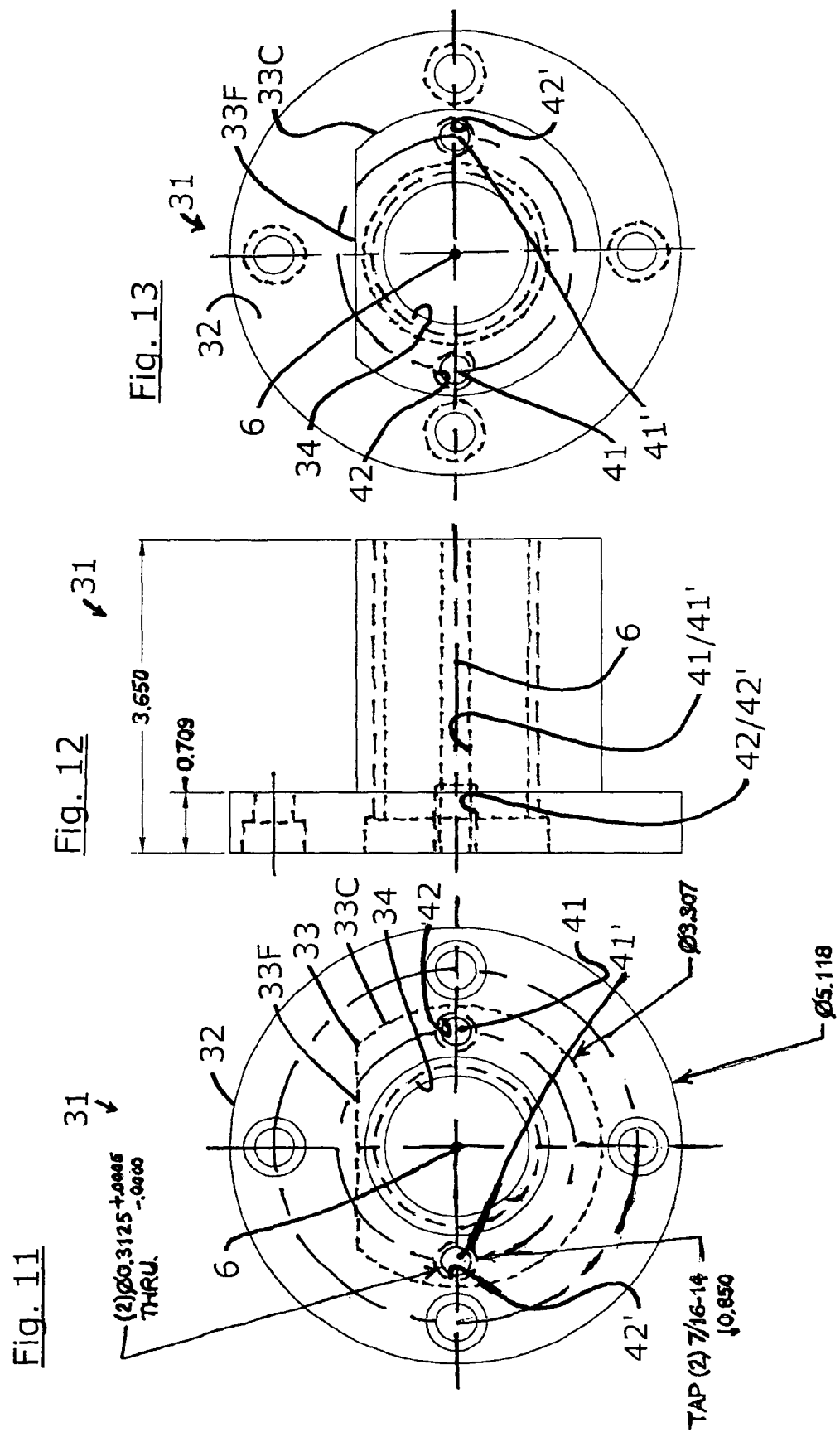

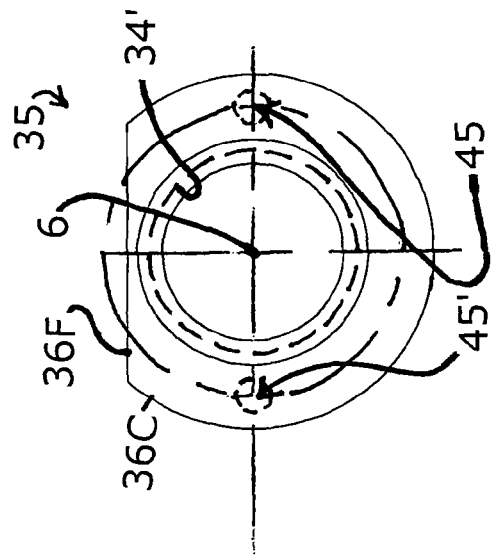
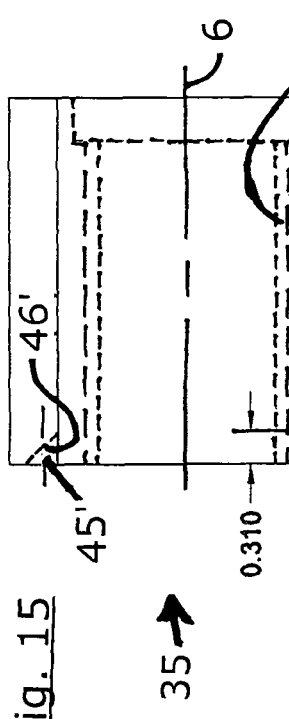
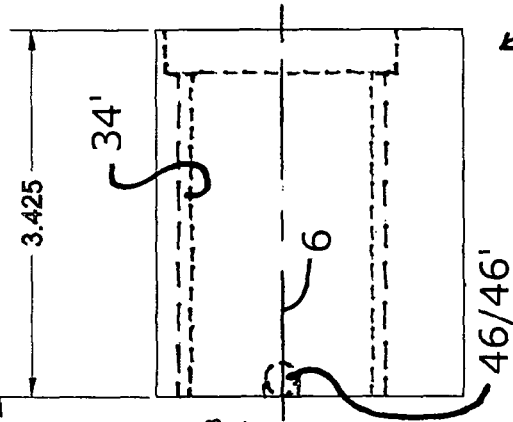
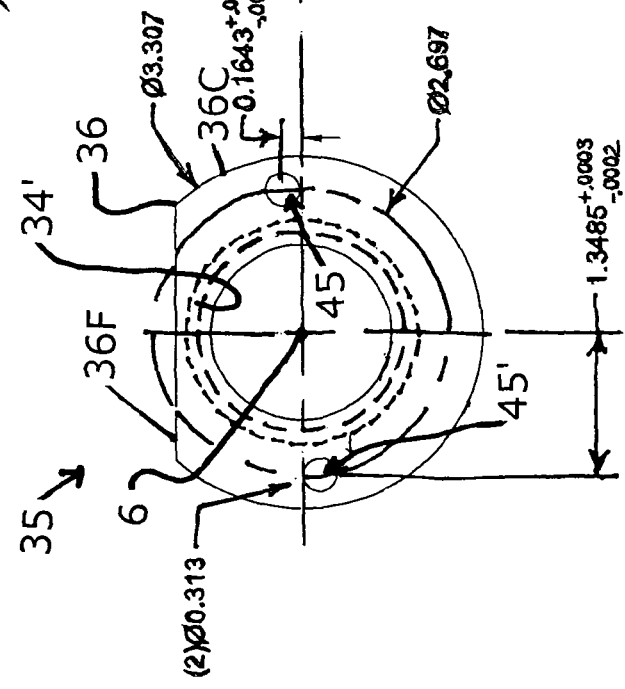

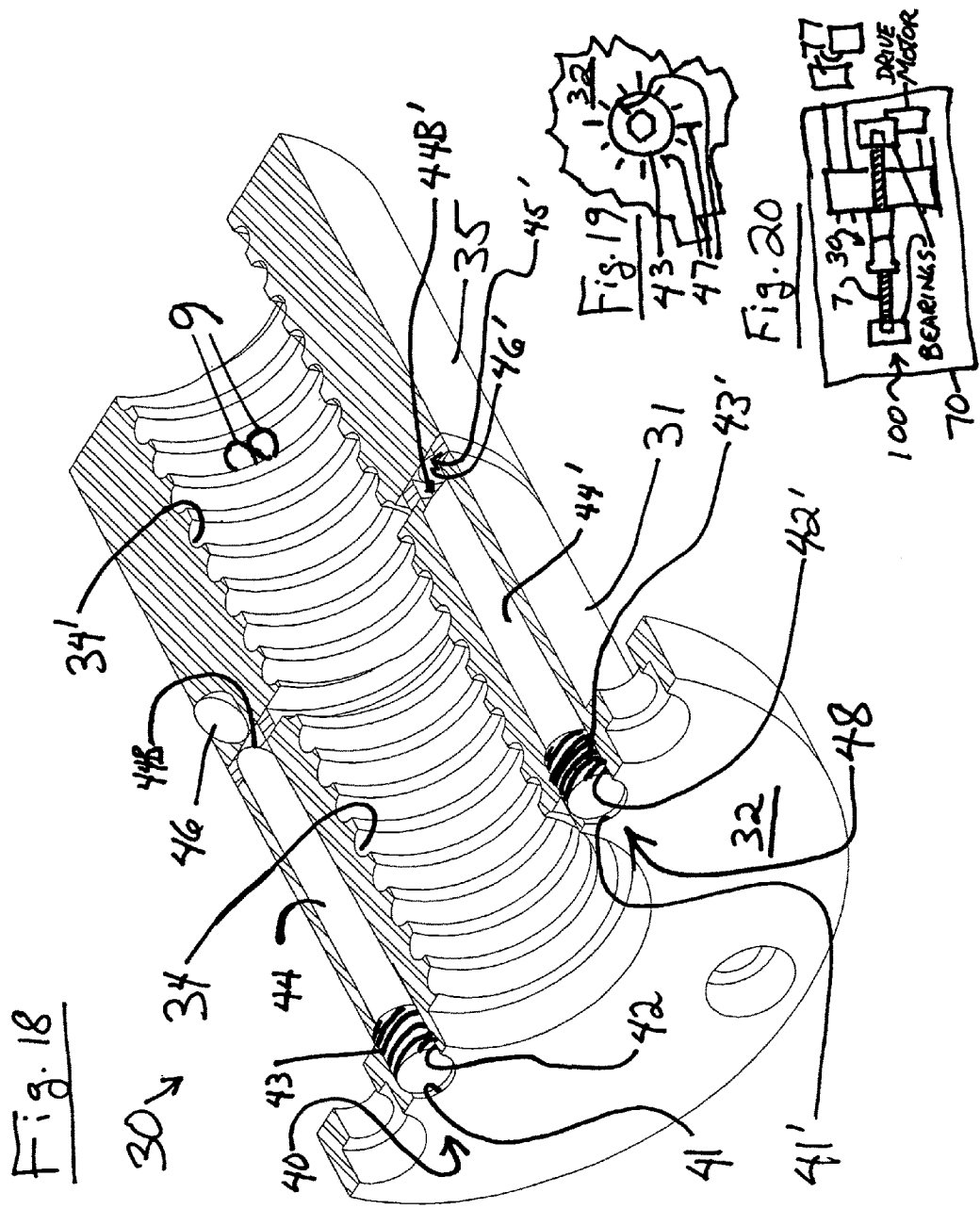

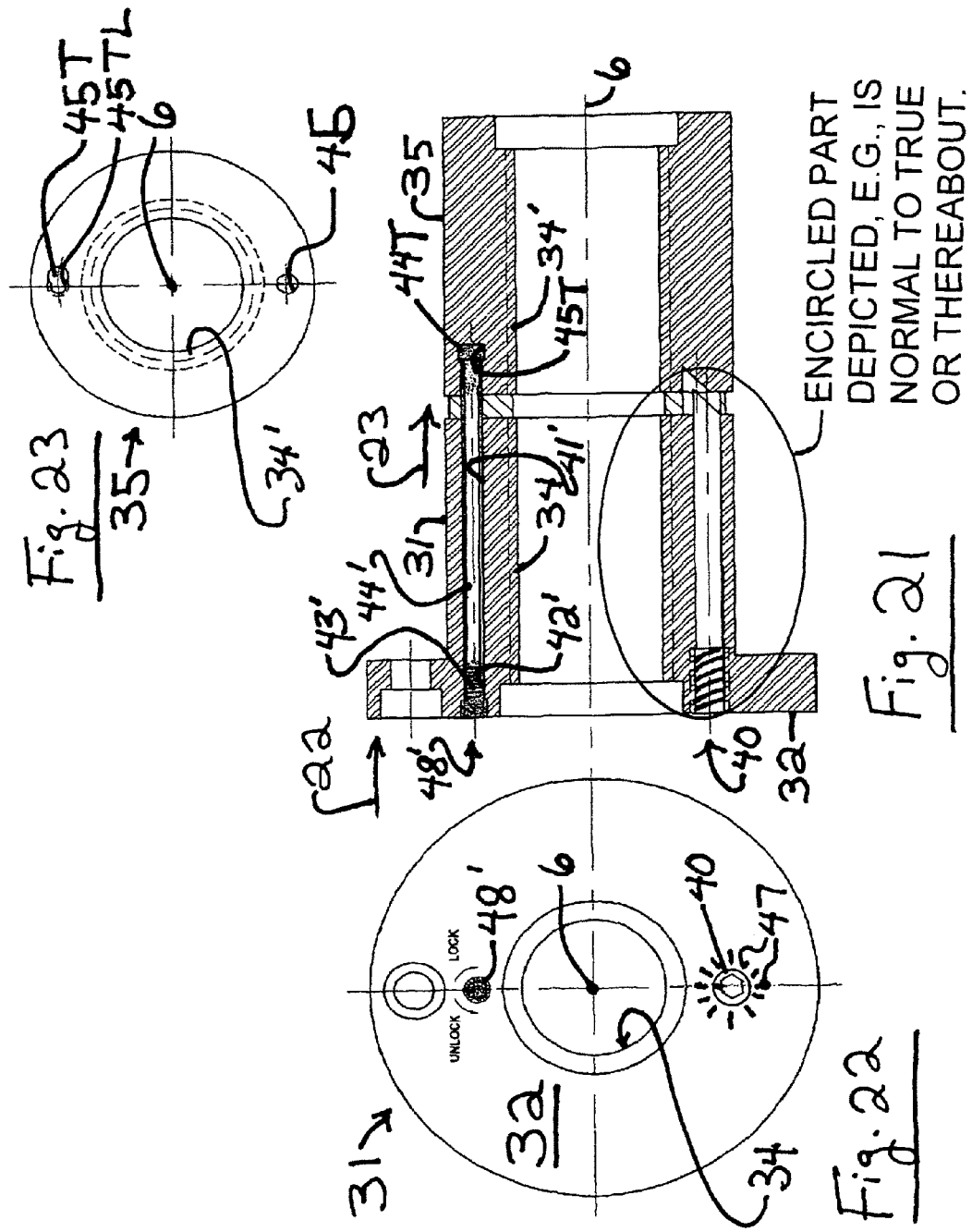

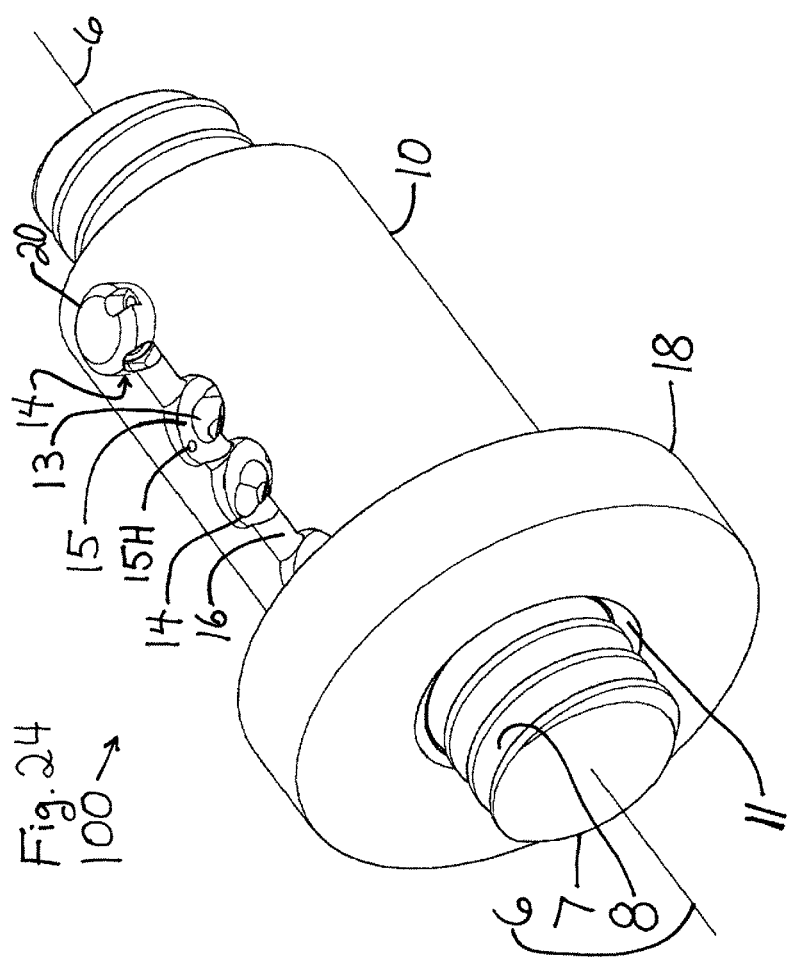

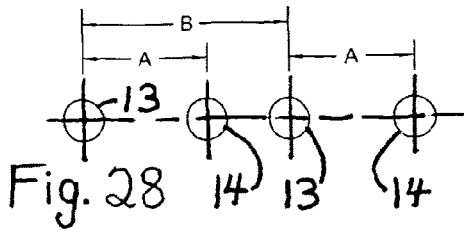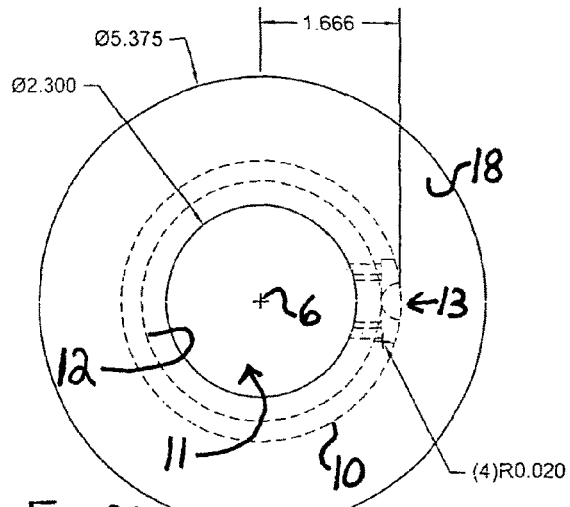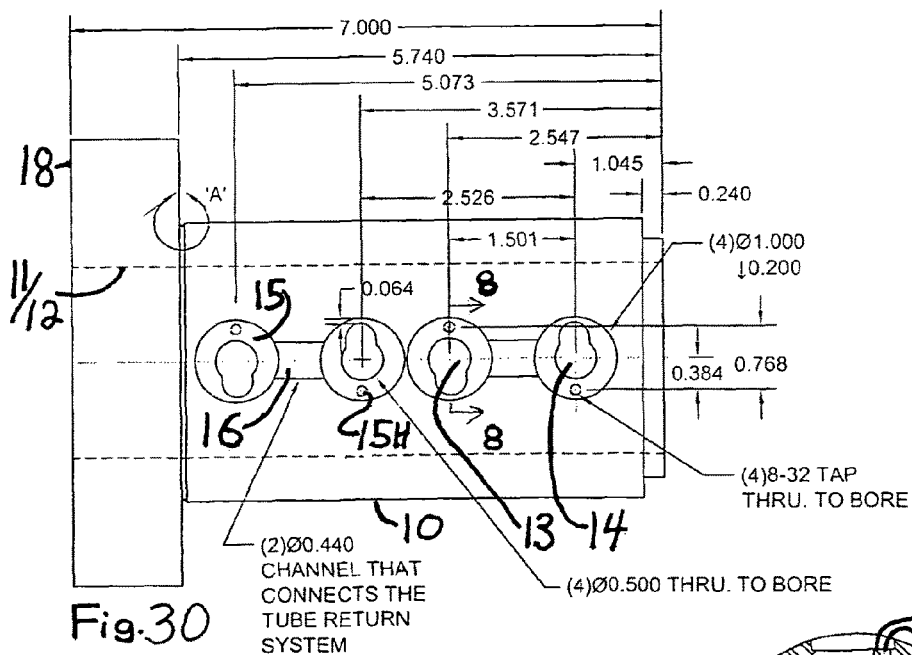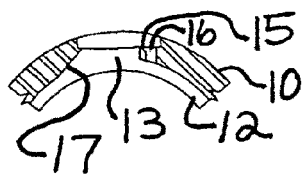

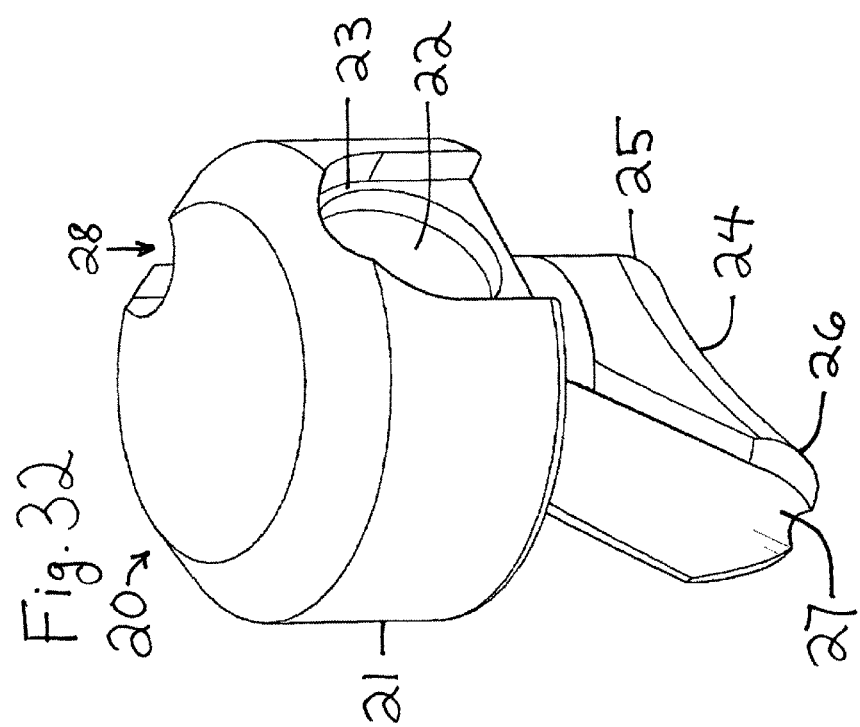

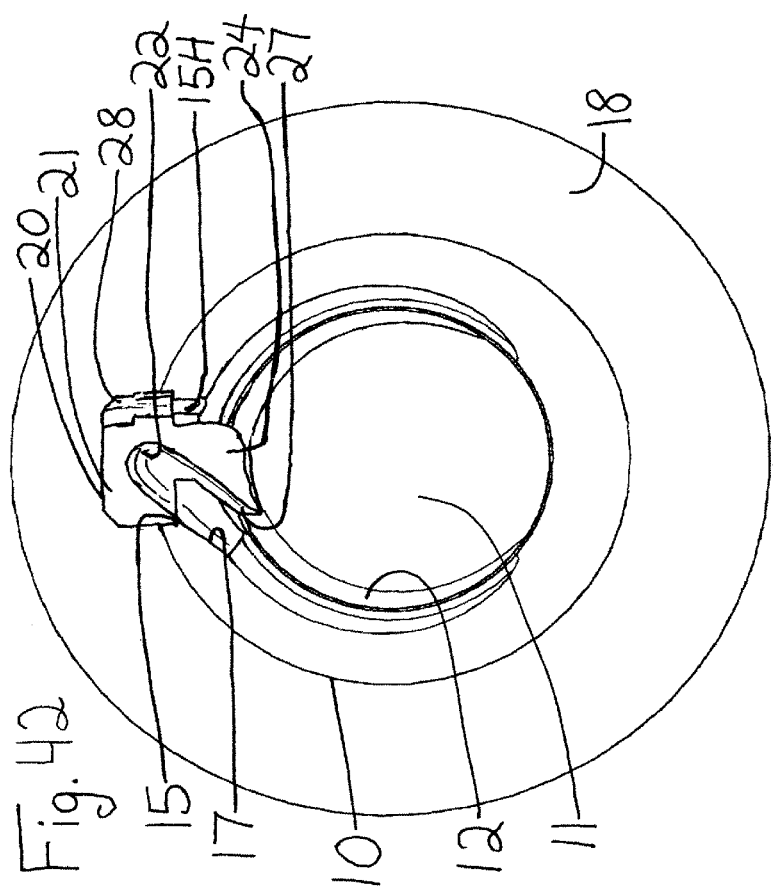

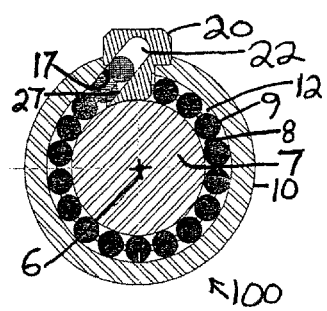
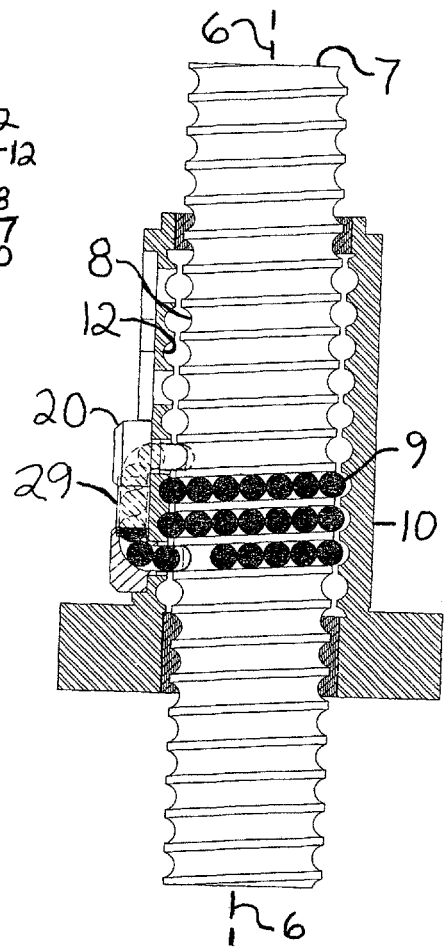

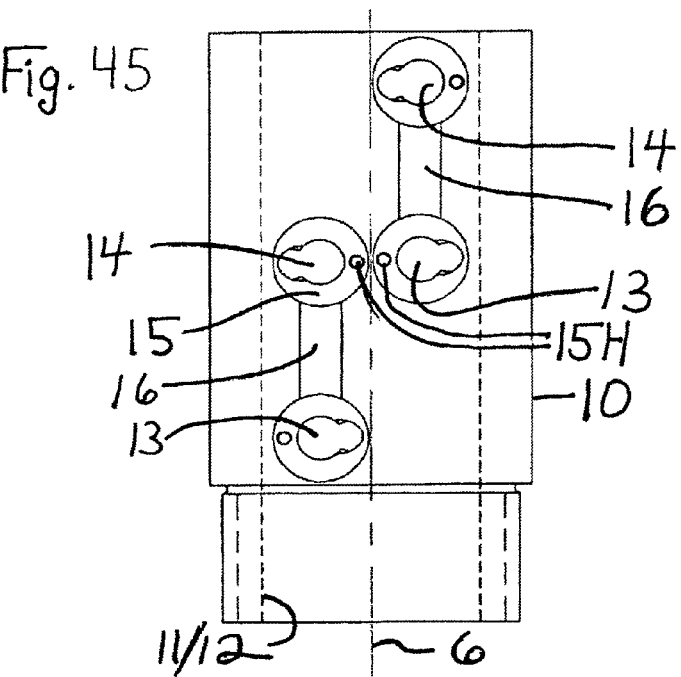
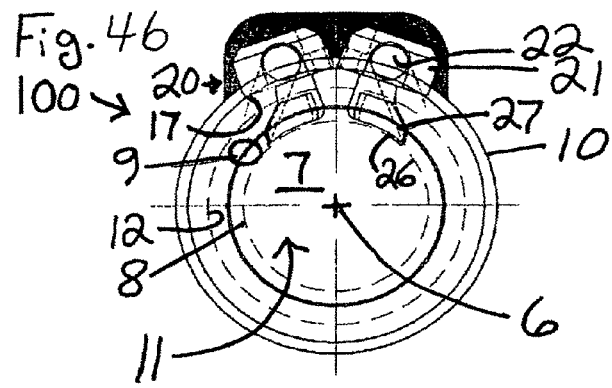

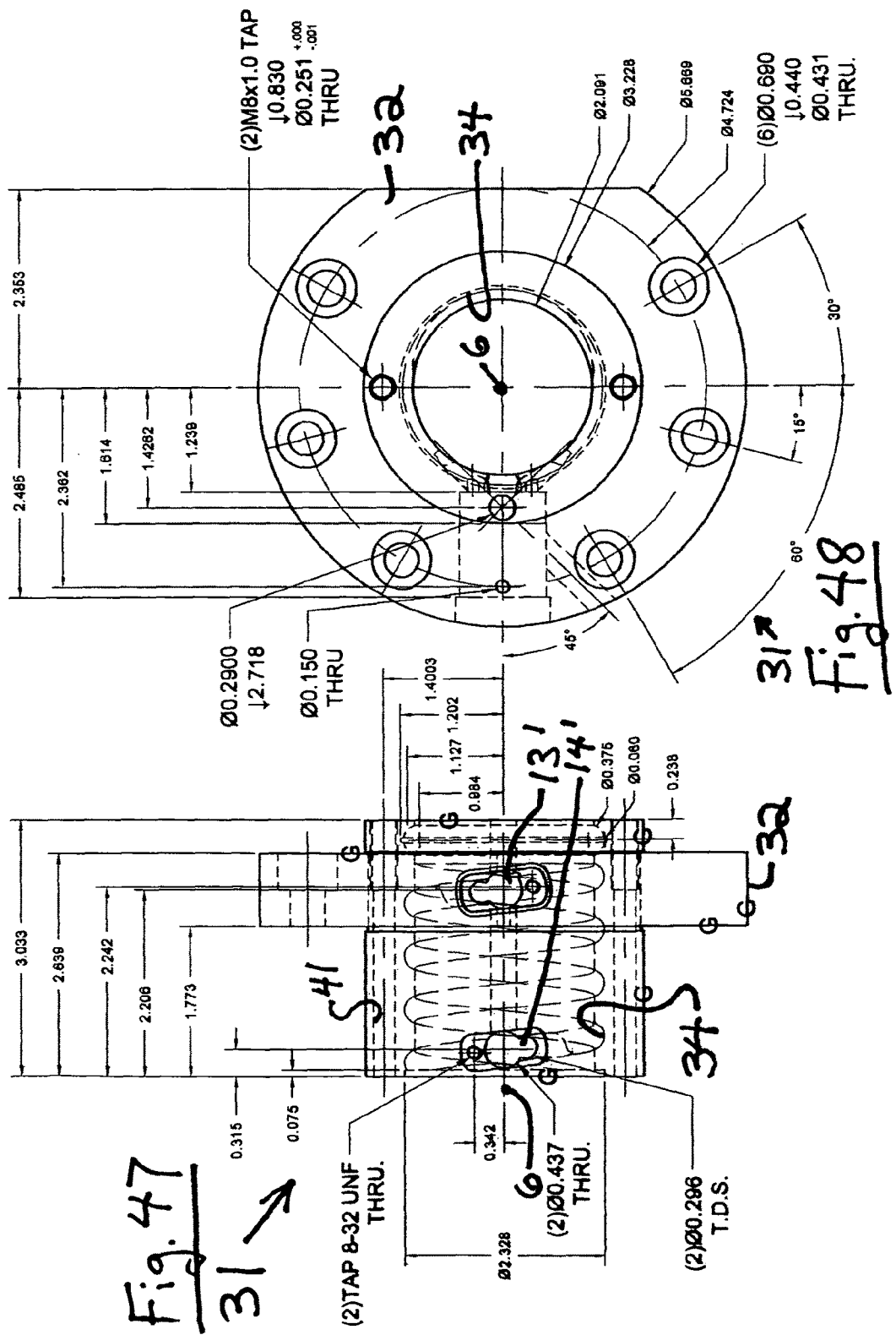

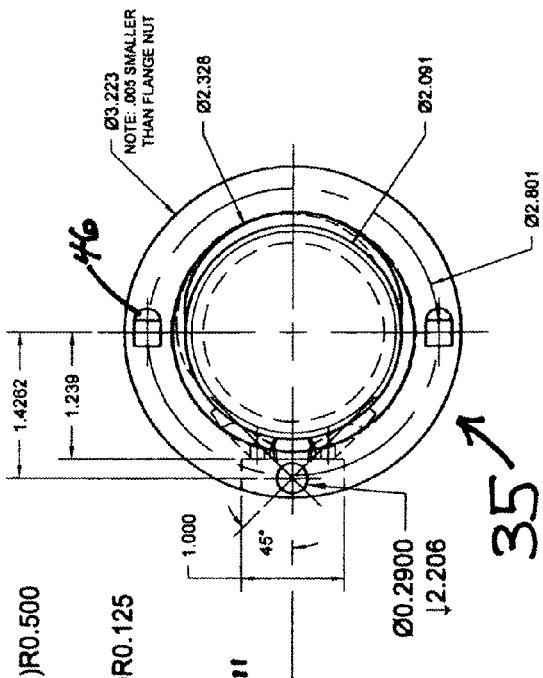

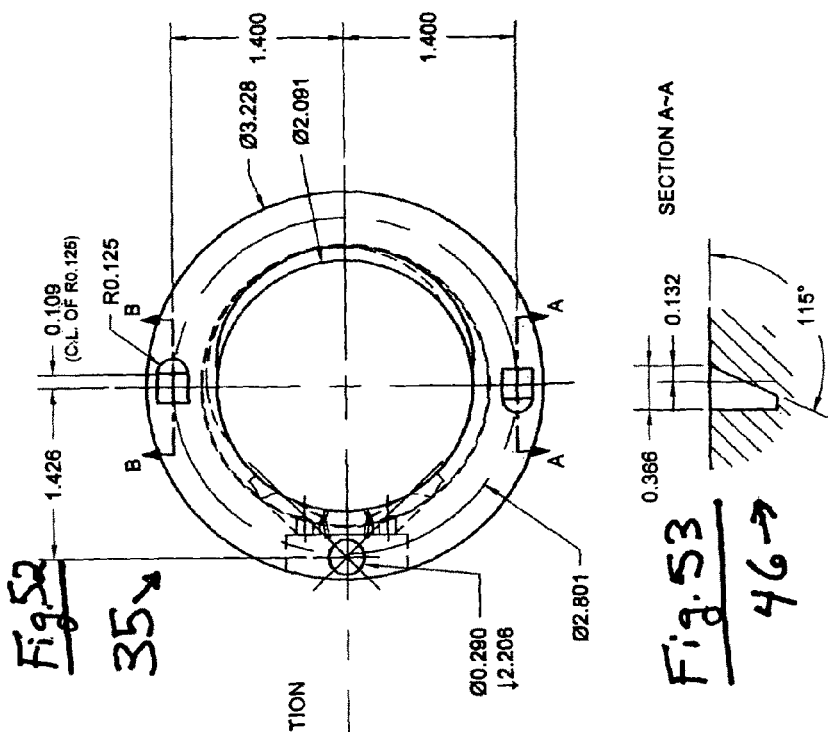

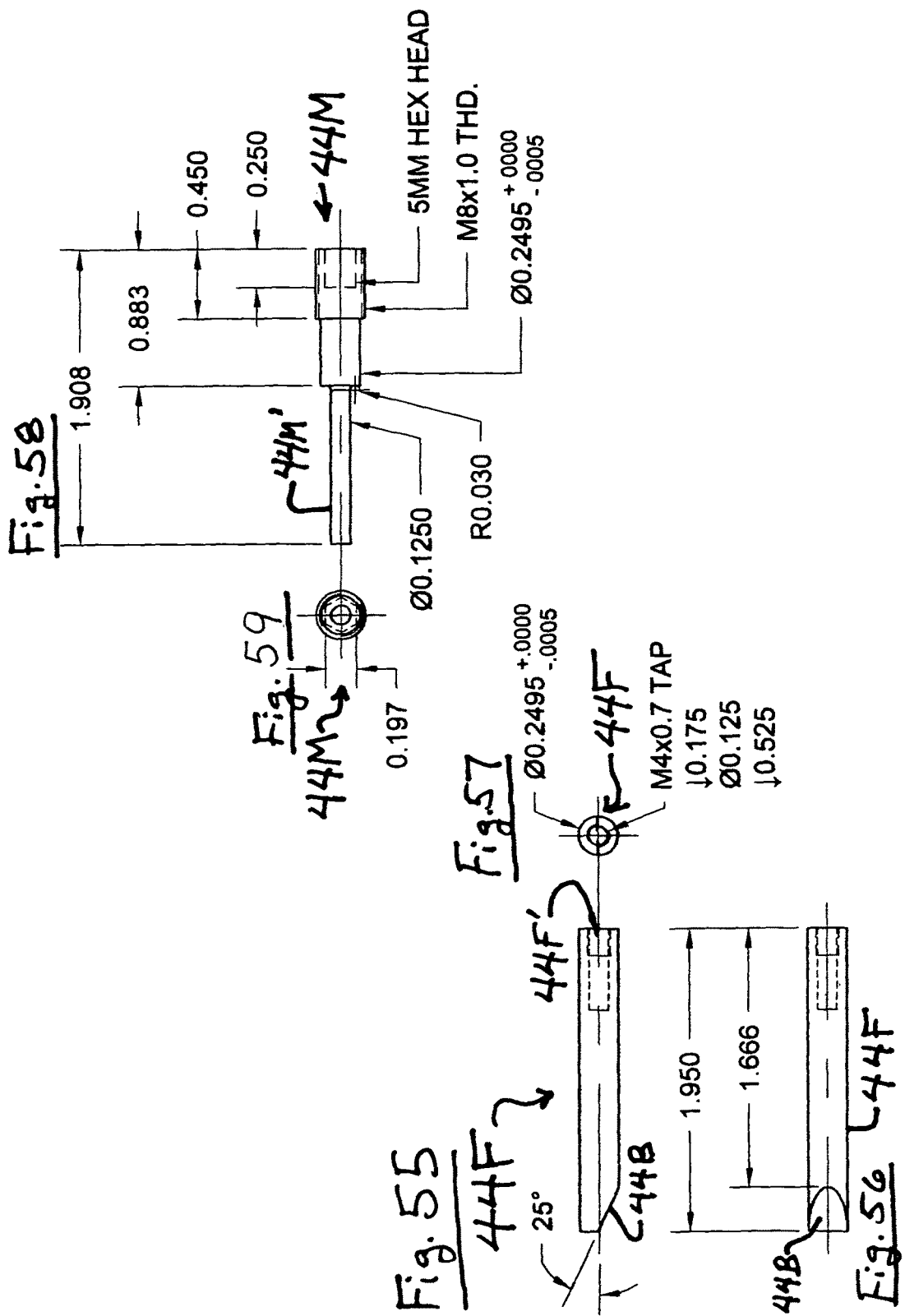

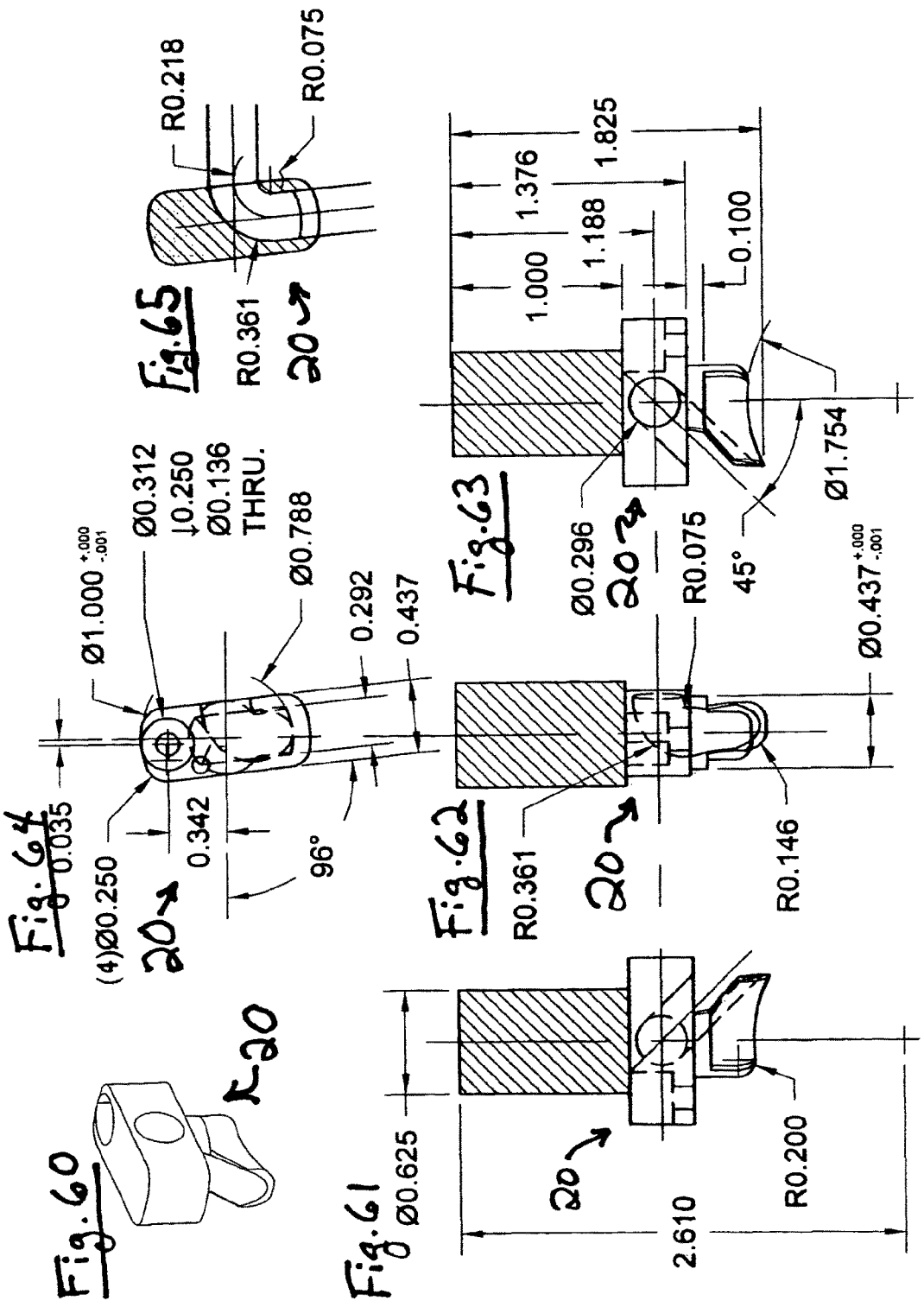

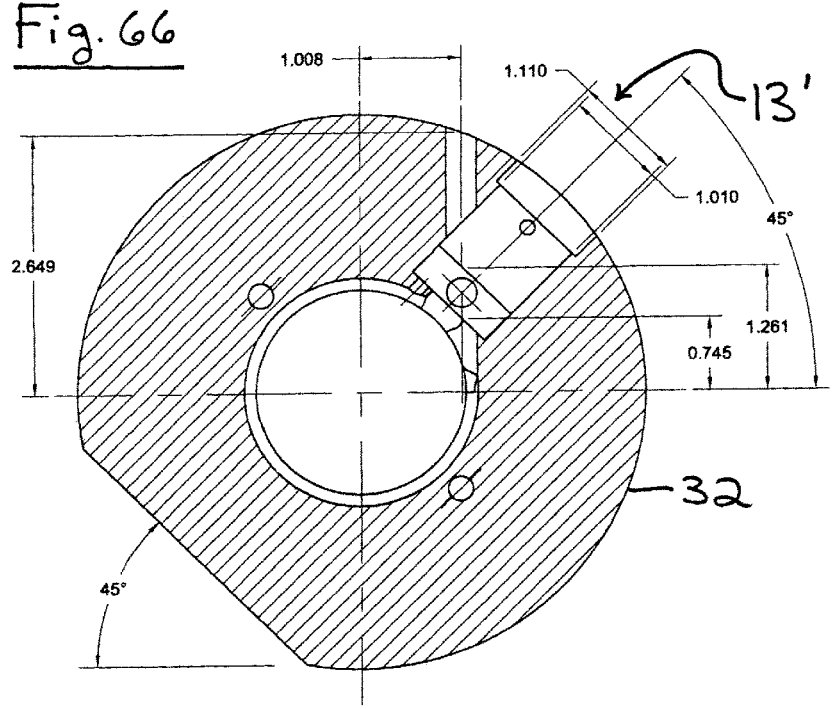

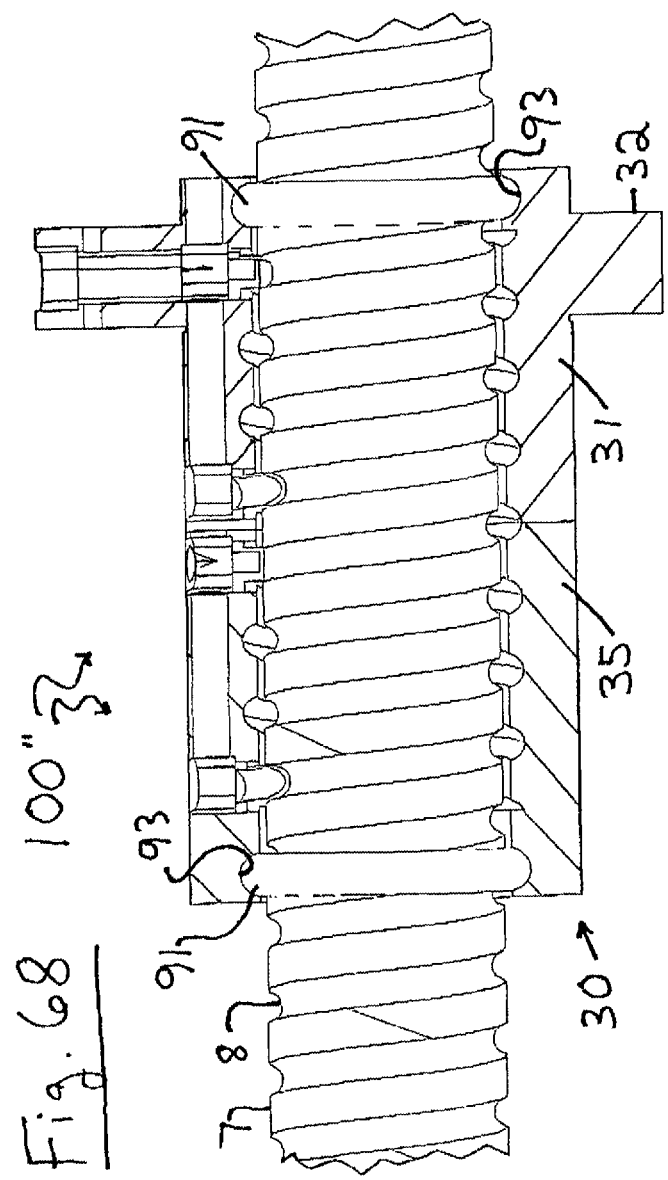

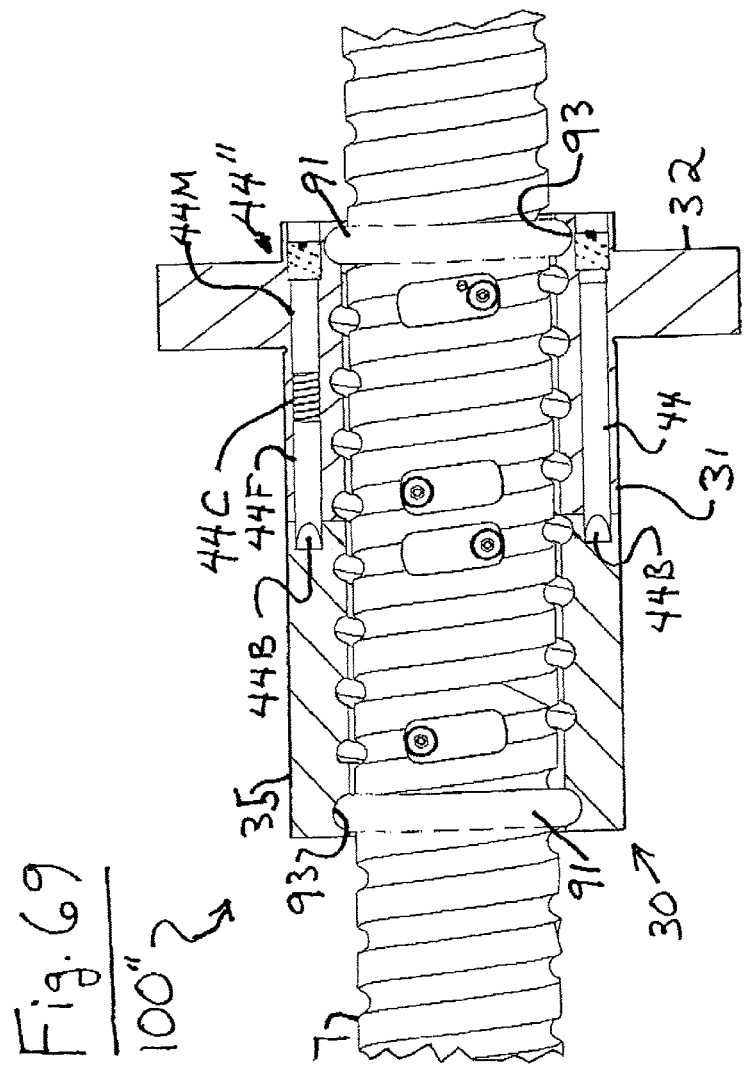

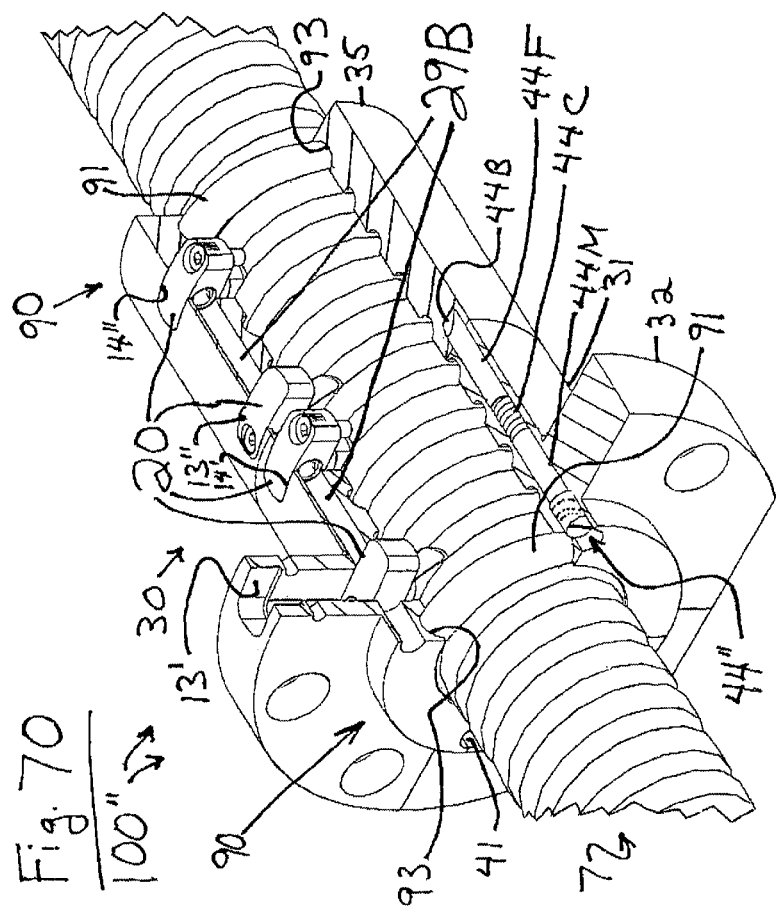

BALL SCREW AND PARTS

This claims the benefits under 35 USC 119(e) of provisional patent application No. U.S. 61/400,979 filed on Aug. 5, 2010 A.D. This also claims the benefits under 35 USC 120 as a continuation-in-part of regular Utility patent application U.S. Ser. No. 12/924,503 filed on Sep. 28, 2010 A.D., now U.S. Pat. No. 9,062,748 B1, which claims the benefits under 35 USC 119(e) of provisional patent application No. 61/277,799 filed on Sep. 30, 2009 A.D. The specifications of those applications, in their entireties, to include drawings, are incorporated herein by reference.

FIELD AND PURVIEW OF THE INVENTION

This concerns a double nut capable of adjustment in a ball screw unit to regulate tension between the nut and the ball screw with their ball bearings so as to avoid or repair backlash in or maintain precision with the unit. The adjustment may be made without removal of the ball screw unit from a machine in which it operates, or automatically. Of concern also are the ball screw unit having such a nut as well as methods of making, repair or adjustment of, and manufacturing with the ball screw unit with such a nut. A wiping contrivance is also of concern in a ball screw nut or unit in aspects analogous to those of the double nut. A depending foot, ball bearing return may be of similar concern.

BACKGROUND TO THE INVENTION

Precision ball screw units are invaluable in manufacturing. The motion they impart along the axis of the screw must be precise and controllable. Naturally, after a passage of time in use, the ball bearings and/or the raceways for them wear, which reduces the precision and control of the unit from that which is imparted by the ball bearings and their races being under an appropriate tension to a point where the tension is lessened, which may even be to the point where the screw turns freely in the nut, a condition called "backlash." A precision ball screw unit with backlash is no longer a precision unit, for instance, having devolved from a machine for manufacturing precision parts to that for roughing in or making crude parts only.

Repair of a machine having a compromised precision ball screw unit can be an enormous problem. It is common to take one to four days in the field to remove the compromised ball screw unit and ship it to a repair facility, two to three week under normal conditions to repair and reload the unit at the facility, including wait time in the queue, and ship the repaired unit, and another day or two back in the field to reinstall and qualify the repaired unit. In addition, when a backlash condition occurs and repair of the precision ball screw unit is sought, since the condition is symptomatic of fairly extensive wear, not uncommonly other things are found in need of repair in the unit, increasing the expense and repair time even further. The total time for major repair and reinstallation could reach six to eight weeks. Of course, back in the field, the manufacturing down time, labor expense, and loss of revenues can be great and extensive, if not debilitating.

Many nuts for precision ball screw units are of the double nut variety.

Various attempts at adjusting a worn double nut ball screw unit are known. Among these are those that employ a threaded, rotatable spacer between the two major pieces of the double nut, which themselves are correspondingly threaded, which spacer is rotated to change the position of the races in the nuts relative one another to provide tension for the ball bearings. This design is known as an Adjust-o-Lok® ball screw and nut assembly, and its rotating spacer is located on the major diameter of the ball nut assembly, which is not easily accessible. Such a design is for rolled thread type ball screws, not precision ball screws. In any event, in such a design and others, the worn ball screw unit still must be removed from its mount in the machine to make the adjustment, and then be reinstalled and, as may be applicable, qualified, which may take a significant amount of time, which engenders significant manufacturing down time and its expenses and loss or revenue. See also, U.S. Pat. Nos. 3,124,969 and 4,487,087. A hydraulic self adjusting ball screw is known. It, too, provides for application of axially directed force, and it is very expensive.

Further art is known. See, e.g., U.S. Pat. Nos. 3,059,494; 3,498,651; 4,008,625; 4,463,041; 4,669,324; 4,827,789; 5,193,409; 5,501,118; 5,467,661; 5,582,072; 5,697,252; 5,911,789; 6,082,209; 6,142,032; and U.S. Pat. No. 6,928,895 B2; U.S. Pat. No. 7,337,688 B2; U.S. Pat. No. 7,506,557 B2 and U.S. Pat. No. 7,562,596 B2.

As well, particulate waste from manufacturing can quickly erode a ball screw.

Furthermore, as set forth in the Ser. No. 12/924,503 regular utility application, among types of ball screw nuts further to tube ball-return types may be mentioned 20th Century, Flopover, Starr, Cincinnati, and Jena-Tec models. Such nuts can have high unit and installation costs, a lack of adaptability to various ball screws or machinery therewith, a quick rate of wearing out and/or a practical inability or economic un-viability to repair some models. Compare, U.S. Pat. Nos. 477,642; 611,832; 1,704,031; 2,380,662; 3,053,105; 4,638,548; 4,760,635; 4,953,419; 5,063,809; 5,493,929; 5,653,145; 5,791,192; and patent or publication Nos. U.S. Pat. No. 6,176,149 B1, U.S. Pat. No. 6,425,302 B2, U.S. Pat. No. 6,446,520 B1, US 2006/0137485 A1, US 2007/0186708 A1, U.S. Pat. No. 7,516,681 B2, U.S. Pat. No. 7,520,193 B2, U.S. Pat. No. 7,523,681 B2 and U.S. Pat. No. 7,523,682 B2—of which those to Chen, Lee, Misu, Greubel and Pan et al. may be of greater possible interest in this connection.

It would be desirable to more effectively address and/or ameliorate if not solve one or more of such problems. It would be desirable to provide the art an alternative.

A FULL DISCLOSURE OF THE INVENTION

In general, provided is a double nut for a ball screw unit having a main axis along a ball screw part of the unit, which can be adjusted to regulate tension between the double nut and the ball screw with their ball bearings, which comprises:
  the double nut, which has at least two parts, each of which
    having a housing and internal face portions in an initial position relative to one another and which correspond to external race portions of the ball screw part, which is for receiving a set of ball bearings, with the at least two parts connected to each other, at least indirectly; and
  an adjustment mechanism, which can be accessed from an external end of the double nut and/or be self-adjusting, and which can transmit force from that end of the double nut into a force inclusive of a force generally radially applicable and generally orthogonal relative to the main axis so that, when appropriate, the internal race portions of the at least two parts can be moved into an adjusted position different from the initial position relative to one another.

Provided as well are the ball screw unit having such a double nut, and methods of making, repair or adjustment of, and manufacturing with the ball screw unit having such a double nut—the former comprising providing a double nut and providing such an adjustment mechanism thereto; the next comprising providing the ball screw unit having such a double nut, and from an external end of the double nut, adjusting the adjustment mechanism, or providing a self-adjusting adjustment mechanism and operating it, such that tension is regulated between the nut and the ball screw with their ball bearings; and the lattermost comprising providing the ball screw unit having such a double nut in a machine, for example, for making manufactured parts, providing stock if one or more parts will be manufactured, and operating the machine, for example, to make part(s) from the stock. The present double nut can be of or for a precision ball screw. Accordingly, the manufactured parts may be precision manufactured parts.

A wiping contrivance is provided as well. It comprises a wiping member in generally annular form that can be placed to closely fit and guard a space between a ball screw nut and screw in threaded ball-including combination with the nut. The ball screw unit with the wiping contrivance may be incorporated into machinery, which may be such that part(s) can be made therewith. Thus, methods of making and manufacturing with the ball screw unit having such a wiping contrivance are provided—the former comprising providing a ball screw unit with a ball screw and providing such a wiping contrivance thereto; and the latter comprising providing the ball screw unit having such a wiping contrivance in a machine, for example, for making manufactured parts, providing stock if one or more parts will be manufactured, and operating the machine, for example, to make part(s) from the stock.

Employable also is a depending foot, ball bearing return in a ball screw nut that can include the double nut for a ball screw unit and/or a unit with the wiping contrivance, which comprises a housing having an internal passage along an axis for receiving a ball screw shaft with an external, spiral raceway adapted to receive a set of ball bearings; at least one internal, spiral raceway in the internal passage of the housing adapted to receive an contain the set of ball bearings in conjunction with the external, spiral raceway of the ball screw shaft; and, for at least one of the at least one internal, spiral raceway:
- a first opening at a first position in the raceway through the housing, adapted to receive a first ball bearing accommodating return; and
- a second opening at a second position in the raceway spaced apart from the first position in the raceway through the housing, adapted to receive a second ball bearing accommodating return;

wherein the first and second ball bearing accommodating returns are part of a ball bearing return system that cycles ball bearings from the set of ball bearings external to the internal passage of the housing; and at least one of the first and second ball bearing accommodating returns embraces:
- a body with a passage for the ball bearings, which opens in a first direction; and
- a depending foot having a heel and toe, which joins the body and has below the body in the toe of the foot for the ball bearings a channel that faces in a second direction substantially perpendicular to the first direction when viewed from a top position and that can communicate ball bearings with the passage in the body to or from the at least one internal, spiral raceway in the internal passage of the housing adapted to receive and contain the set of ball bearings in conjunction with the external, spiral raceway of the ball screw shaft.

The nut with depending foot, ball screw return can be combined with a suitable ball screw shaft and set of ball bearings to provide a ball screw. Such a ball screw may be incorporated into machinery, which may be such that part(s) can be made therewith.

The invention is useful in manufacturing and other endeavors.

Significantly, by the invention, at least one drawback in the art is effectively addressed or ameliorated if not overcome, and the art is provided an alternative. More particularly, double nut ball screws can be made to be adjustable and have their adjustment carried out in the field, at the manufacturing site where the unit is installed in machinery for making parts, without removal of the unit from the machinery or at most by merely moving the table about the ball screw for more convenient access. The adjustment can be very precise. Often it only takes the short time needed to remove guards to access the double nut on the ball screw and make a manual adjustment on the external end of the nut so that proper tension is restored for operation. In precision ball screw art, this is a most significant advance. Then, too, such an adjustment need not be carried out only after backlash conditions have occurred, but periodic adjustments in the form of preventive maintenance can be carried out to keep the precision in the precision ball screw unit throughout its useful life. Moreover, since the time that a precision ball screw would otherwise remain operating under backlash conditions can be easily reduced if not avoided, and since greater wear occurs under backlash conditions and less wear occurs under conditions that proper tension is applied in the ball screw, the useful life of the ball screw is extended. Thus, the effective lifetime of a double nut ball screw unit as a precision device for manufacturing to close tolerances can be extended significantly, perhaps in some circumstances even to double life or more as a precision unit. And so, not only is down time reduced from weeks to minutes or hours, but also, since the life of the machine in which the present double nut ball screw unit is installed is extended, new machinery or parts for it need be obtained less frequently, further reducing cost of manufacturing. Plus, by avoiding backlash or at least reducing the time that the machine suffers under the condition of backlash, not only is new life extended to the ball screw unit, but also extended life is provided the associated machinery by saving stresses and impulse generated resonance shock forces from repeated movement, some of which is under great stress, under backlash conditions, to include on end bearings of the ball screw, in drive components such as the drive couplings and drive motor, in the machine ways, and so forth and the like. Even more, the stocking of duplicate "critical parts" such as precision ball screws can now be effectively reduced, if not avoided altogether, in manufacturing. What is more, automatic or self-adjustment of the double nut ball screw can avoid a manual adjustment procedure, which further may enhance efficiencies. With automatic adjustment capability, down-time for adjustment itself can be avoided, even further enhancing efficiencies. An automatically adjustable double nut ball screw may, as a default or at an end of its life as an automatically adjustable unit, be manually adjustable as well, which further enhances both versatility and efficiency. The reductions in precision manufacturing losses can be monumental. Many existing double nut ball screws can be retrofitted with the present adjustment mechanism to provide an end adjusting ball screw hereof. The wiping contrivance can extend life or avoid premature failure of a ball screw unit, notably in a manufacturing scenario where grit and so forth may otherwise enter the unit to abrade ball bearings and raceways. A nut with depending foot, ball bearing return, notably when the return is embodied as an insert, may have or engender a lower unit cost than known ball screw nuts; be easy to install and be adaptable to various ball screws and associated machinery, with a lower machinery installation cost than known ball screw nuts; have a long service life; be repaired practically and economically; and/or have a reduced number of parts compared to competing devices.

Numerous further advantages attend the invention.

The drawings form part of the specification hereof. With respect to the drawings, which are not necessarily drawn to scale, the following is briefly noted:

FIG. 1 is a perspective view of a precision ball screw unit having an end adjustable, double nut, with an allen wrench placed in an externally accessible facing part of its adjustment mechanism for adjusting. Generally, if not indicated elsewhere herein, sectional views for other drawings, if not expressly with respect to FIG. 1 by analogy thereto, are indicated by broken, lines on FIG. 1 referenced to those views by the letter "F" followed by the number of the figure having the sectional view.

FIG. 2 is a perspective, cut away view of the end adjustable, double nut found in the ball screw unit of FIG. 1.

FIG. 3 is a perspective, cut away view of an end adjustable, double nut, which may be found in a ball screw unit such as of FIG. 1, and having a spring in its adjustment mechanism.

FIG. 4 is an end plan view of the housing of the externally proximal part of the double nuts of FIG. 2 or 3, i.e., externally proximal regarding its position when the whole assembled double nut is combined with a corresponding ball screw and ball bearings, and installed in machinery that employs the same.

FIG. 5 is a side plan view of the housing of FIG. 4.

FIG. 6 is an end plan view of the housing of FIG. 4, taken at a 180-degree, opposing view path in comparison to that of FIG. 4.

FIG. 7 is an end plan view of the housing of the internal part of the double nuts of FIG. 2 or 3, i.e., internal regarding its position when the whole assembled double nut is combined with a corresponding ball screw and ball bearings, and installed in machinery that employs the same.

FIG. 8 is a side plan view of the housing of FIG. 7.

FIG. 9 is another side plan view of the housing of FIG. 7.

FIG. 10 is an end plan view of the housing of FIG. 7, taken at a 180-degree, opposing view path in comparison to that of FIG. 7.

FIG. 11 is an end plan view of another housing for an externally proximal part of a double nut that may be employed in a precision ball screw unit otherwise as in FIG. 1.

FIG. 12 is a side plan view of the housing of FIG. 11.

FIG. 13 is an end plan view of the housing of FIG. 11, taken at a 180-degree, opposing view path in comparison to that of FIG. 11.

FIG. 14 is an end plan view of is an end plan view of another housing for an internal part of a double nut that may be employed in a precision ball screw unit otherwise as in FIG. 1, which goes in assembly with the housing of FIG. 11.

FIG. 15 is a side plan view of the housing of FIG. 14.

FIG. 16 is another side plan view of the housing of FIG. 14.

FIG. 17 is an end plan view of the housing of FIG. 14, taken at a 180-degree, opposing view path in comparison to that of FIG. 14.

FIG. 18 is a perspective, cut away view of an end adjustable, double nut as may be employed in the ball screw unit of FIG. 1. Compare, FIGS. 11-13, 14-17 and 21-23.

FIG. 19 is a plan view of an installed adjusting set screw, with adjustment indicia.

FIG. 20 is a general schematic plan view of a precision ball screw unit having an end adjustable, double nut, which is installed in a machine for manufacturing.

FIG. 21 is a side cut away plan view of an end adjustable, double nut as may be employed in the ball screw unit of FIG. 1. Compare FIGS. 11-13, 14-17 and 18-20.

FIG. 22 is an end plan view of the externally proximal housing of the double nut of FIG. 21, taken in the direction of arrow 22.

FIG. 23 is an end plan view of the internal housing of the double nut of FIG. 21, taken in the direction of arrow 23.

FIG. 24 is a top perspective view of a ball screw nut, partially assembled, in which a depending foot, ball screw return is present, having inserted a ball screw shaft.

FIG. 28 is an illustration of a formula for a ball screw nut embodiment, which may be employed with a nut as in FIG. 25.

FIG. 29 is a rear plan view of an embodiment of a ball screw nut as of FIG. 25, which employs the formula of FIG. 28.

FIG. 30 is a top plan view of the nut of FIG. 29.

FIG. 31 is a section view of an insert receptacle found in the housing of the nut of FIG. 29, taken along 8-8 in FIG. 30.

FIG. 32 is a top perspective view of a depending foot, ball bearing return, embodied as an insert, and found in the ball screw nut of FIG. 24.

FIG. 42 is a front section view of a ball screw nut embodiment as of FIG. 24, taken through an insert receptacle of the housing and an insert, with no ball screw shown.

FIG. 43 is a front section view of a ball screw nut embodiment as of FIG. 24, taken through an insert receptacle of the housing and an insert, with a ball screw shaft inserted. Compare, FIG. 32.

FIG. 44 is a side section view of the embodiment of FIG. 43.

FIG. 45 is a top plan view of a ball screw nut embodiment, which has staggered entry, plural raceways.

FIG. 46 is a general front plan view of the ball screw nut of FIG. 45, with its inserts and with insert communication relays in place, and combined with a corresponding ball screw shaft.

FIG. 47 is a top plan view of an embodiment of a first housing for a self-adjustable, adjustable torque, double nut for a precision ball screw.

FIG. 48 is a plan view of the housing of FIG. 47, taken along its central axis.

FIG. 49 is a top plan view of an embodiment of a second housing for a self-adjustable, adjustable torque, double nut for a precision ball screw, which may be combined in assembly with the housing of FIG. 47.

FIG. 50 is a plan view of the housing of FIG. 49, taken along its central axis.

FIG. 51 is a further top plan view of the housing of FIG. 49.

FIG. 52 is a further plan view of the housing of FIG. 49, along its central axis.

FIG. 53 is a sectional view of part of the housing of FIG. 49, taken along A-A as found in FIG. 52.

FIG. 54 is a sectional view of part of the housing of FIG. 49, taken along B-B as found in FIG. 52.

FIG. 55 is a side view of an adjustment mechanism rod first part for an adjustable, double nut ball screw that can be made by assembling the housings of FIGS. 47 and 49.

FIG. 56 is a side view of the rod part of FIG. 55, rotated at a 90-degree angle.

FIG. 57 is a view of the rod part of FIG. 55, taken along an axis central thereto.

FIG. 58 is a side view of an adjustment mechanism rod second part for an adjustable torque, double nut ball screw that can be made by assembling the first and second housings of FIGS. 47 and 49, and combined with the rod part of FIG. 55.

FIG. 59 is a view of the rod part of FIG. 58, taken along an axis central thereto.

FIG. 60 is a perspective view of a depending foot ball screw return that can be employed with the housings of FIGS. 47 and 49. Compare, FIGS. 24, 32-44 and 46.

FIG. 61 is a side plan view of the return of FIG. 60, with a machining knob attached thereto.

FIG. 62 is a side plan view of the return of FIG. 60, rotated at a 90-degree angle.

FIG. 63 is a side plan view of the return of FIG. 60, rotated at a 180-degree angle.

FIG. 64 is a bottom plan view of the return of FIG. 60.

FIG. 65 is a view of the channel within the return of FIG. 60.

FIG. 66 is a cross-sectional view taken through a flange portion of a first housing such as that found in FIG. 47, which also shows a depending foot, ball bearing return embodied as an insert mounted therein.

FIG. 68 is a cut-away, elevational view of the ball screw of FIG. 67.

FIG. 69 is another cut-away, elevational view of the ball screw of FIG. 67.

FIG. 70 is another cut-away, perspective view of the ball screw of FIG. 67.

Figure 25:
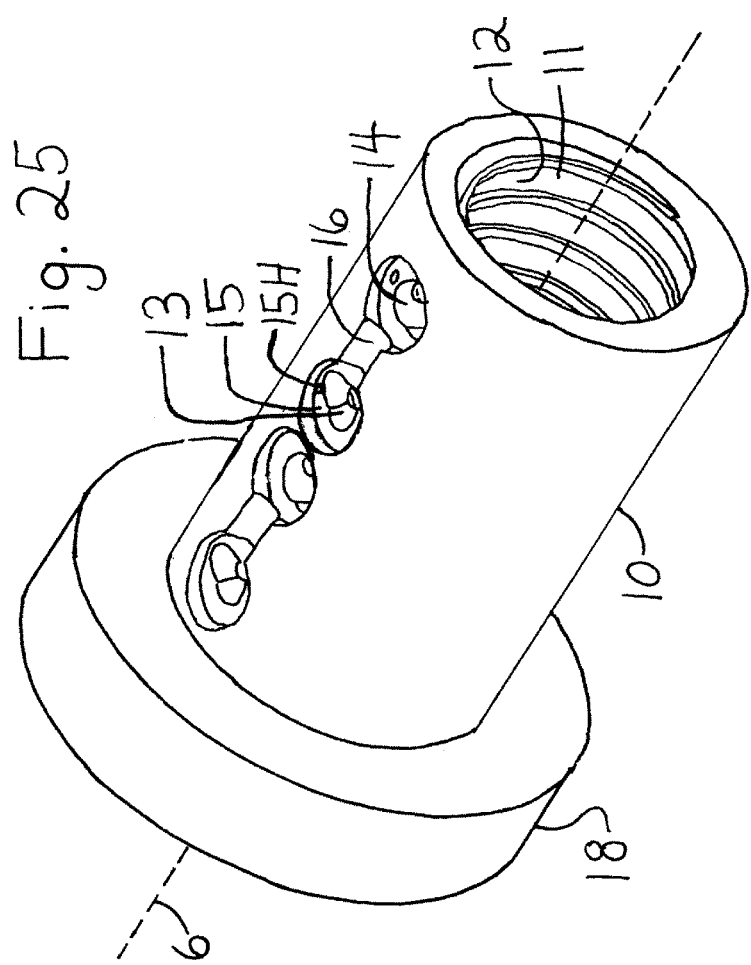
FIG. 25 is a top perspective view of the housing of the ball screw nut in FIG. 24, i.e., with all inserts removed, plus with the ball screw shaft removed.

The invention can be further understood by the present detail, which may be read in view of the drawings. As with the foregoing, the following is to be read in an illustrative and not necessarily limiting sense.

Overall, to make any embodiment or part hereof, any suitable material may be employed. For example, a hardened steel or other metal or alloy may be employed, in general. Plastic, ceramic and/or composite material(s) may be employed itself or themselves, or in conjunction with metal or alloy. Any suitable method or process may be employed. For example, molding or casting, machining and/or cutting, which may include use of EDM methods, grinding, drilling, hardening and/or softening, and so forth and the like, may be employed. Existing devices or parts may be retrofitted, or new devices or parts may be made. For example, an existing double nut can be retrofitted with an adjustment mechanism to provide an end- or self-adjustable double nut, or a new end- or self-adjustable double nut can be made. A new depending foot ball bearing return insert and/or a new wiping contrivance part may be made.

Components or finished devices may be of any suitable size or configuration. For instance, a low profile ball screw nut or unit may be provided; a ball screw nut may have a collar or be collarless, and so forth. A resin or filler may be employed to provide a smooth outer contour to an assembled ball screw nut, especially to esthetically fill external cavities. A resin and/or filler can be absent.

The nut can be assembled with a corresponding ball screw and ball bearings, and any other part(s), to provide a ball screw unit. The ball screw unit can be installed in machinery for manufacturing of part(s), say, from stock, and/or for other functions. Qualification may be carried out.

The present double nut may be for a precision ball screw unit. Generally two housings are employed, each of which has its own race. The nut has an adjustment mechanism for regulating tension between the nut and a corresponding ball screw, which has a corresponding race, with their ball bearings, when the nut is mounted on the screw with the ball bearings in place. In one embodiment, the adjustment mechanism converts, in general, force in a direction generally along the main axis of the double nut and corresponding ball screw to that which is generally radial and orthogonal with the main axis. Force in the direction generally along the main axis may also be applied from one portion of the double nut to the other. The adjustment mechanism may convert rotational forces into that which is generally radial and orthogonal with the main axis such as found with a screw, meshing planetary gears, a meshing spline gear, a worm gear arrangement, and so forth and the like. A lever force may be applied, say, to move against a cam or wedge surface. A spring and pin combination, optionally with a gear or lever can maintain preload automatically to extend precision operation of preloaded ball double nuts. Hydraulic or pneumatic pressure may provide the required force. A combination of such devices to obtain or maintain such conversions of force may be employed. The unit may be configured so that the required force may be applied periodically to adjust the torque, or configured so that the required force may be applied constantly so as to provide for constant preloading. One adjustment mechanism or more may be employed. A locking contrivance may secure the position of an adjusted adjustment mechanism. A ball screw with the adjustment mechanism may be considered to have adjustable torque.

Figure 67:
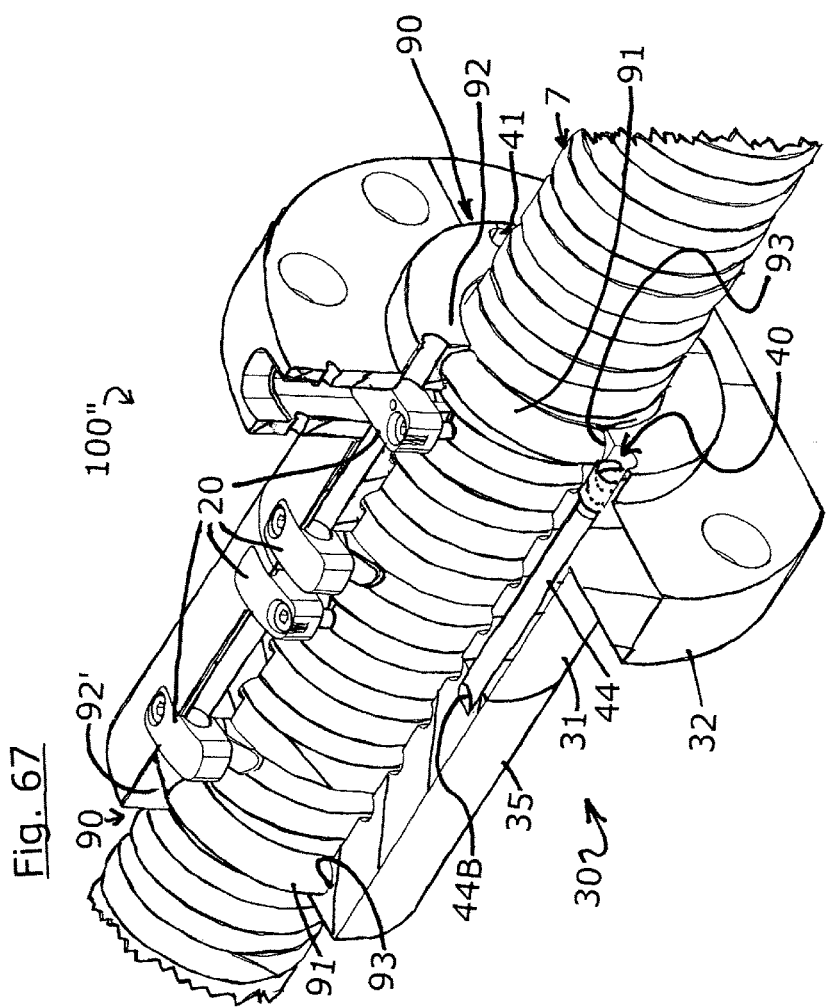
FIG. 67 is a cut-away, perspective view of an assembled self-adjustable, adjustable torque, double nut precision ball screw, which has parts as can be found within FIGS. 47-66, with its ball bearings not depicted.

With more particular reference to the drawings, especially FIGS. 1-23, 47-60 and 66-70, precision ball screw unit 100, 100" includes, along major axis 6, screw 7, which includes external race 8 for receiving ball bearings 9; plus the ball bearings 9. The unit 100, 100" also includes adjustable, double nut 30, which may be end- or self-adjustable; and adjustment mechanism 40. A unit 100 may be installed in machine 70 for making parts 77 (and likewise with respect to ball screw nut 100' in a unit, and the unit 100").

The double nut 30 has first, externally proximal housing 31 with externally facing flange 32 and optionally truncated outer surface 33 including partially cylindrical surface 33C and flat surface 33F about which ball return contrivances 33R may be positioned; internal race portion 34 receives the ball bearings 9. The double nut 30 also has second, internal housing 35 with optionally truncated cylinder outer surface 36 including partially cylindrical outer surface 36C and flat surface 36F about which ball return contrivances 33R' as before may be positioned; internal race portion 34' receives the ball bearings 9.

The adjustment mechanism 40 may be accessed from an external end of the first housing 31 of the double nut 30 although the external end could be on an appropriate end of a corresponding second housing in lieu of or in addition to that which is on the first housing 31. The adjustment mechanism 40 may be self-adjusting. The adjustment mechanism 40 can include support tube 41, say, in the first housing 31, which can be provided with female threads 42 for threading in male set screw 43, for example, a standard set screw or a well known Nylok® lock nut that may have a nylon locking component within a metal screw, which when threaded and screwed in can provide a force directed along or parallel to the major axis 6, which screw may have attached or can contact separate rod 44 having beveled or angled end 44B in any suitable angle, say, an about 20-degree to about 50-degree angle, for example, a 25-degree angle or thereabout or a 45-degree angle or thereabout. Compression spring 44C may be interposed between the screw 43 and a separate rod 44, or between pieces of multi-piece rod 44" having first, female piece 44F and second, male piece 44M in which a female receptacle 44F' of the first piece 44F can have inserted therein male shaft 44M' of the male piece 44M, for example, to assist in adjusting and/or provide for self-adjusting capability. The self-adjusting capability is advantageously provided by the multi-piece rod 44". When the spring 44C is fully compressed, say, in the multi-piece rod 44", the multi-piece rod 44" may be treated as if it were a one-piece rod and manually adjusted with appropriate provision for such manual adjustment. The beveled or angled end 44B can enter opening 45 in the second housing 35, which has wedge 46, which may have any suitable angle, say, an about 70-degree to about 40-degree angle, for example, a 65-degree angle or thereabout or a 45-degree angle or thereabout, and contacts the angled wedge 46 so that, when force along the main axis 6 is applied to the rod 44 by screwing the screw 43, it is transmitted, at least in part to a force that is radially applicable and generally orthogonal relative to the main axis 6. Such radially applicable and generally orthogonal force is directed toward an opening face of the helical race 8 of the screw 10, in other words, counter to the threading configuration of the race 8. An associated force along the linear direction of the main axis 6 may also be transmitted. For an example, with a roughly 0.04-inch radial arc movement, an associated forward movement of roughly 0.0004 of an inch may occur, depending, of course, on the helix configuration, wear, and other factors involved. Thus, in a precision ball screw unit 100, 100" that is worn, the internal races 34, 34' of the two housings 31, 35 are moved into an adjusted position different from the initial position relative to one another, and the ball bearings 9 in relation to the external race 8 of the screw 7 and the internal races 34, 34' of the first and second housings 31, 35 are brought under tension and adjusted to restore the appropriate tension for precise operation. And so, the ball bearings 9 are thrust against the appropriate faces of the helical races 14, 34, 34' more suitably for precision and control with the unit 100, 100". Indicia 47 can be provided to calibrate or mark position to help regulate or monitor the adjustment(s) made. An adjustment mechanism, for instance, the adjustment mechanism 40, may be provided in solitary or multiple form with respect to one of the housings in a double nut device.

Locking mechanism 48 may be provided, say, with support tube 41', male threads 42', set screw 43', rod 44', beveled or angled end 44B', opening 45' and wedge 46' generally corresponding to the features 41, 42, 43, 44, 44B, 45 and 46 but with the bevel or angle 44B' and wedge 46' configured opposite the bevel or angle 44B and wedge 46. When the tension is set as may be desired, for example, through turning the set screw 43, then the locking mechanism 48 is activated, for example, through turning the set screw 43' so that the radial motion opposing the helical threads of the unit 100 as well as associated forward motion is checked appropriately. Locking mechanism 48' has the support tube 41', male threads 42', set screw 43' and rod 44' but has T-shaped end 44T that enters opening 45T, which forms a T-shaped receptacle over part of its expanse so that bayonet insertion and attachment may be carried out: when the set screw 43' is turned after insertion of the T-shaped end 44T in the opening 45T so that the T-shaped end 44T is positioned under ledge 45TL in the opening 45T, the locking mechanism 48' can be locked or unlocked through interaction with the components 44T, 45T and 45TL.

The wiping contrivance helps avoid grit in a ball screw. It may be embodied, for example, as a member in annular form made of a material, say, one that is relatively soft and/or resilient, for example, a felt, which, even in a passive manner, can wipe away grit or refuse its passage to the interior of an assembled ball screw where it could damage or erode the ball bearings and raceways. Such an annular member may be supported by a support member, which may be integrally made with part of a ball screw nut housing, or made separately and then attached thereto.

With more particular reference to the drawings, especially FIGS. 67-70, wiping contrivance 90 can include annular member 91, made, for example, of F-1½-inch diameter wool felt wicking, cut to a length about or slightly more than a circumference of a nut and ball screw the annular member 91 is intended to protect, and coiled into annular form. Support member 92, 92' can be part of a housing, for example, about external ends of a first and second housing 31, 35, respectively, each with groove 93 to hold the member 91 in place. Thus, the contrivance 90 can closely fit and guard the space between a ball screw nut and screw in a threaded ball-including combination with the nut.

The depending foot, ball bearing return, although it may be made integrally and together in one piece with a ball screw housing, can be provided as an insert, which, for example, can be of one piece, and which may be provided to a housing of one or more pieces. The housing may have provided therein an angled channel for pickup and/or drop-off of ball bearings in the spiral raceway in conjunction with the insert. Such a return or insert may be associated with a ball bearing accommodating depending foot return or insert communication relay, say, a tube, can be provided to connect a pair of spaced apart returns or inserts or a machined-in return associated with an insert for ball bearing communication between the returns or inserts external the internal passage of the housing. If the pair is not spaced very widely apart, say, where inserts touch to have their openings in their first directions communicate directly with one another, a separate ball bearing communication relay between the inserts may be absent. Ball bearing communication between a pair of machined-in returns, a pair of inserts, or a machined-in return and inserted insert couple, may be parallel to the central axis of the housing, which can provide for a minimal amount of material external the nut, which can make for increased ease of incorporating the same in machinery of various sorts. There may be one pair, or two or more pairs of the returns and/or inserts per ball screw nut. When there is a plurality of pairs of returns and/or inserts per nut, the pairs may have communication between returns and/or inserts of each pair generally along the same line parallel to the central axis of the nut in, say, a first pair then second pair relationship, i.e., as in-line pairs.

There may be staggered pairs of returns and/or inserts where each of the pairs has communication along separate lines, each of which also may be parallel to the central axis. Finished inserts can be modified by machining to accommodate various pitches and diameters of ball screw nuts. The foot of the insert, with its abundant reserve and strengthening material, helps to provide for this. A long service life can be maintained.

With the depending foot, ball bearing return, notably even when embodied as an insert, a low profile ball screw nut or unit can be provided. Such an insert may have a generally circular body when viewed from the top and be generally cylindrical or even conical with respect thereto, have a generally elliptical or ovoid body view from the top, or have one or more truncations to a generally circular, elliptical or ovoid body, be polygonal when viewed from the top such as in a square or rectangular shape; have a polygonal shape with rounded corners, for example, as a rounded square or rectangle when viewed from the top; or have another shape, which may include a shape with a linear and curvilinear outline; its body may have a convexo-concave shape when viewed from the top, and so forth. An insert may have generally upright or slanted sides akin to those mentioned for the generally cylindrical body. An insert may fit in the housing in close registry to a corresponding opening. An interference fit may be provided. Fastening with a fastener, for instance, a rod, wedge, or screw, and so forth and the like, at any suitable location with respect to the insert and housing may secure the insert to the housing. Also, gluing, welding and/or magnetic force may be employed for fastening.

Figure 26:
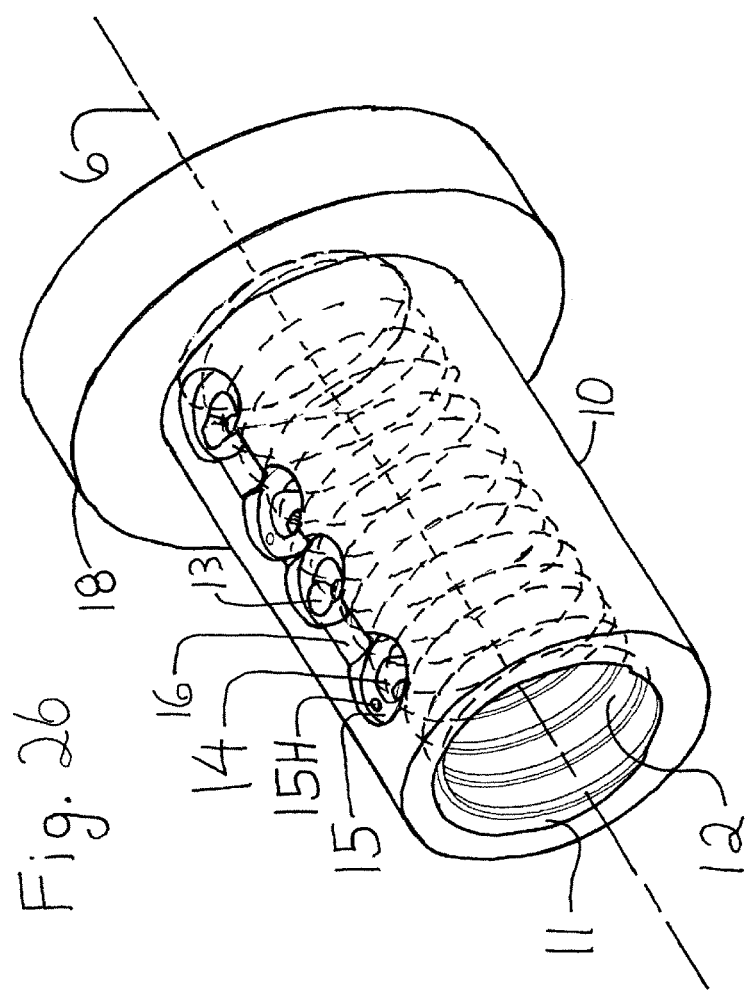
FIG. 26 is a top perspective plan view of the housing in FIG. 25.
Figure 27:
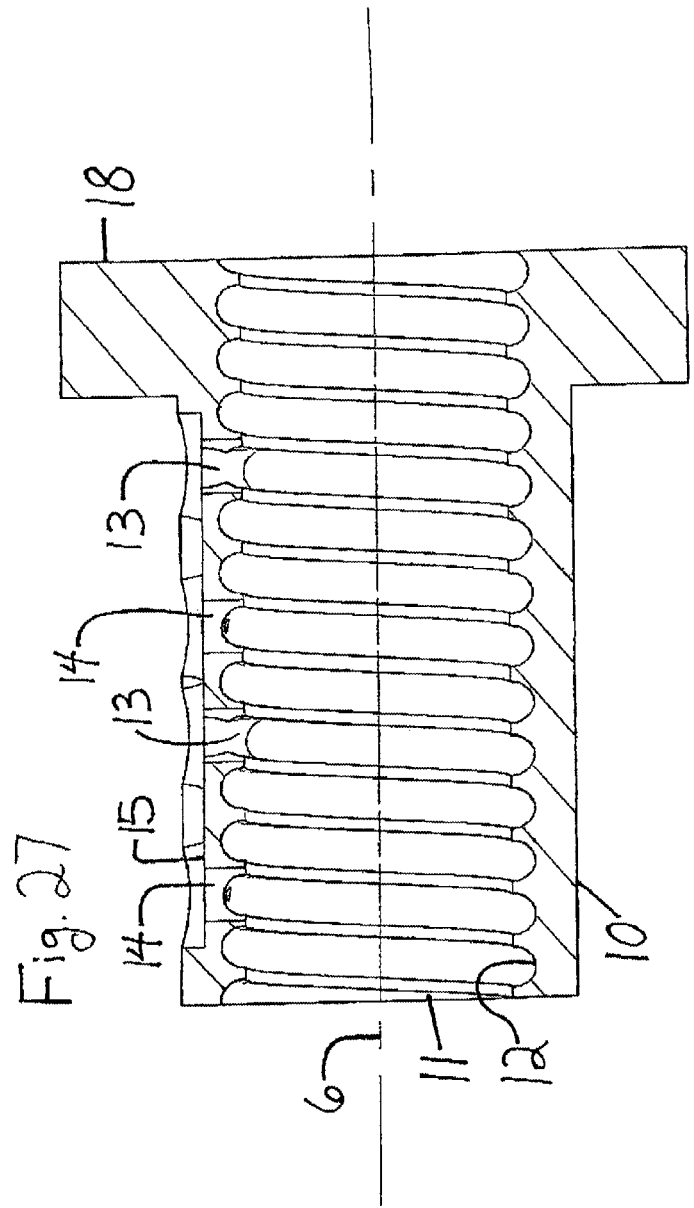
FIG. 27 is a side sectional view of the housing in FIG. 25.
Figure 33:
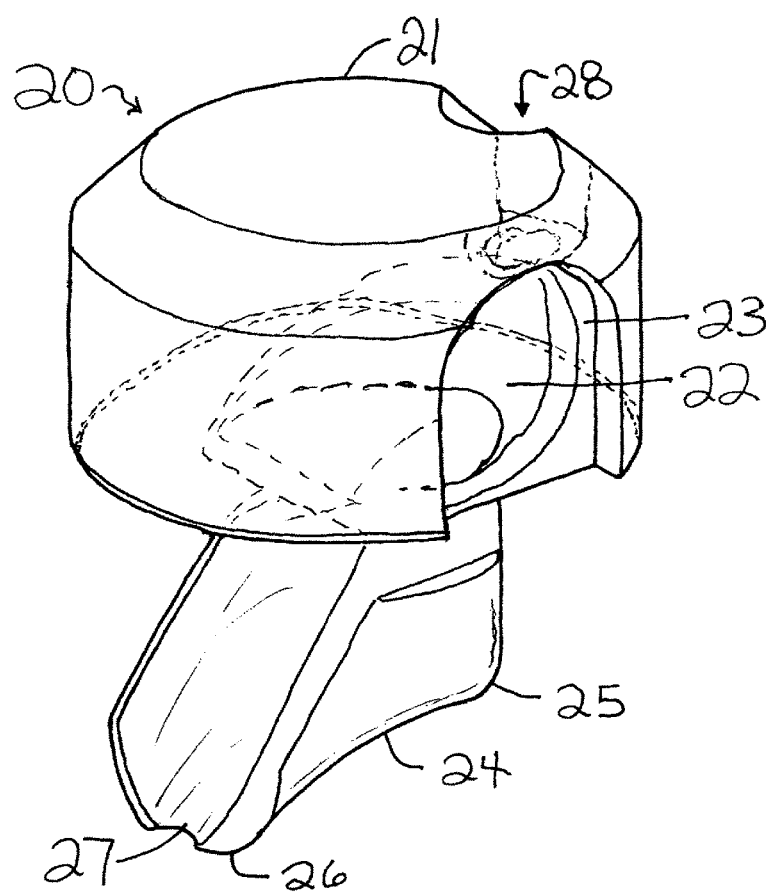
FIG. 33 is a top plan perspective view of the insert of FIG. 32.
Figure 34:
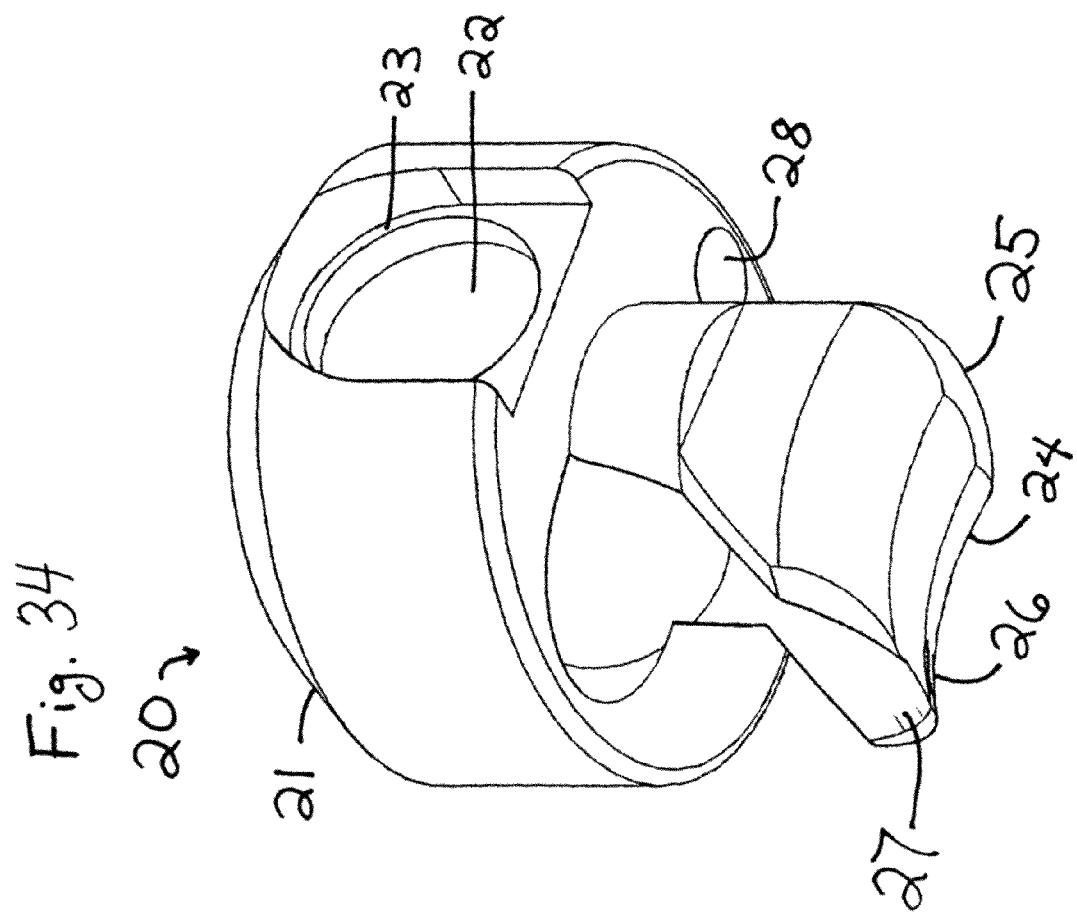
FIG. 34 is a bottom perspective view of the insert of FIG. 32.
Figure 35:
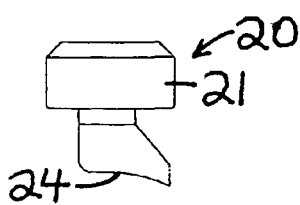
FIG. 35 is an elevational view of an embodiment of an insert as in FIG. 32.
Figure 36:
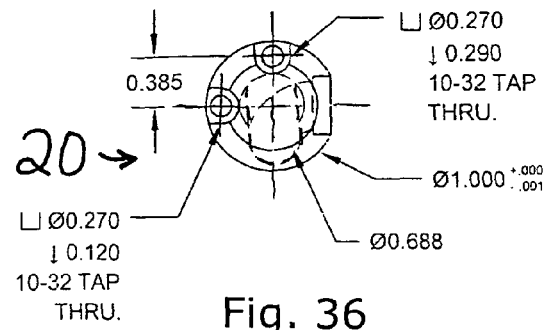
FIG. 36 is a top plan view of the insert of FIG. 35.
Figure 37:
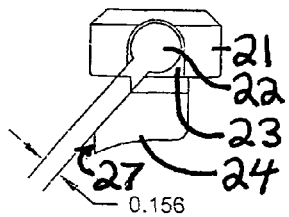
FIG. 37 is an elevational view of the insert of FIG. 35, taken from the opposite side whereof.
Figure 38:
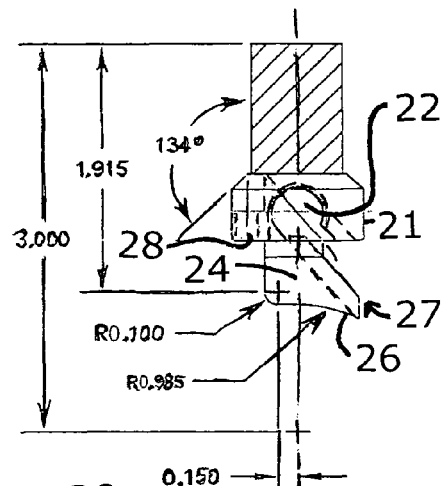
FIG. 38 is a side plan view of the insert of FIG. 35, which shows a machining flange that is removed in the finished insert.
Figure 39:
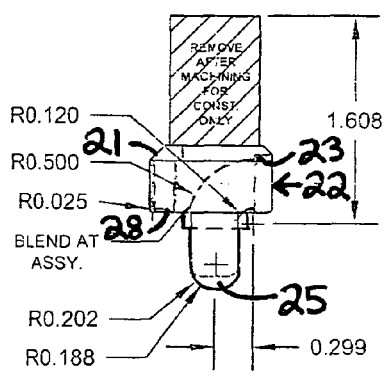
FIG. 39 is a side plan view of the insert with machining flange of FIG. 38, taken form a view orthogonal thereto.
Figure 41:
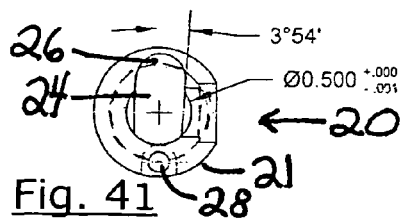
FIG. 41 is a bottom plan view of the insert of FIG. 35.
Figure 40:
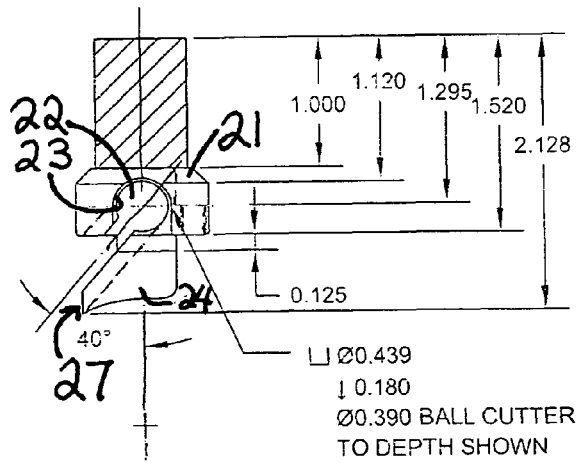
FIG. 40 is a side plan view of the insert with machining flange of FIG. 38, taken form the opposite side whereof.

Returning with more particular reference to the drawings, especially FIGS. 24-46 and 60-70, ball screw nut 100' and the unit 100" is set up about the central axis 6 and can receive a ball screw shaft 7 having an external, spiral raceway 8 adapted to receive ball bearings 9. The nut 100' includes housing 10 having internal passage 11 along the axis 6. Internal, spiral raceway 12 is provided in the internal passage 11 of the housing 10 and is adapted to receive and contain the ball bearings 9 in conjunction with the external, spiral raceway 8 of the ball screw shaft 7 when the shaft 7 and ball bearings 9 are assembled with the housing 10. Each internal spiral raceway 12 has communication to outside the internal passage 11 through the housing 10 with two openings 13, 14, each of which may be generally in an old fashioned skeleton keyhole shape when viewed from the top, and may include surrounding insert seat 15 and optional tapped insert securing hole 15H, for example, for receiving a securing screw to secure or help secure an insert 20. Likewise, with respect to a double nut 30 such as in the unit 100", two openings 13', 14' and 13", 14", which may be in rounded rectangle shapes when viewed from the top, communicate with the internal races 34, 34'. There may be inter-opening channel 16 between spaced apart seats 15. Ball bearing pickup/drop-off upper surface 17 has a suitable angle not parallel with a radius originating from the axis 6, say, about a 40-degree angle, to provide part of a passage for the ball bearings 9. Collar 18 may be present. One or both of the openings 13, 14 or 13', 14' or 13", 14" is adapted to receive and accommodate one insert 20 per opening.

A depending foot, ball bearing return such as the insert 20 includes body 21 with passage 22 for the ball bearings 9, which opens in a first direction, say, along a line parallel to the central axis 6 and external the internal passage 11 of the housing 10 when the insert 20 in inserted in the housing 10 (and likewise with respect to the double nut 30). Passage inter-insert communication member resting inner shoulder 23 may be provided. Depending from and joined to the body 21 there is foot 24, which has heel 25 and toe 26 portions. In the toe 26 is provided channel 27 for the ball bearings 9, which faces in a second direction substantially perpendicular to the first direction when viewed from a top position and which can communicate the ball bearings 9 from or to the passage 22 in the body 21 of the insert 20, to or from the at least one internal, spiral raceway 12 in the internal passage 11 of the housing 10, which is adapted to receive and contain the ball bearings 9 in conjunction with the external, spiral raceway 8 of the ball screw shaft 7 when the shaft 7 and housing 10 are assembled together (again likewise with respect to the double nut 30). The channel 27 corresponds with the ball bearing pickup/drop-off upper surface 17 when the insert 20 is assembled with the nut 100' or unit 100", say, including a lower surface substantially parallel with the angle of the pickup upper surface 17, so that an angled pickup or drop-off passage is provided for the ball bearings 9 when the insert 20 is combined with the housing 10 of the nut 100' or assembled with the double nut 30 of the unit 100".

Insert communication relay 29 may span a pair of inserts 20. An insert communication relay such as the relay 29B may be built-in to a housing.

Numeric values herein may be considered approximate or exact.

In addition, for FIGS. 4-17, in general, the following is further noted (dimensions in inches, and so forth):
Ball Nut Data
Diameter: 1.575
Lead: 0.3937
Hand: Right Hand
Start: 1
Ball Diameter: 0.250
Helix: 4-degree, 24'
Root Diameter (Finished): 1.875
T.P.C.: 2.5
P.U. Angle: 30-degree angle
   Tolerances
   Fractions ±1/64
   Two-place decimal: ±0.010
   Three-place decimal: ±0.005
   Four-place decimal: ±0.0005
   Angles: ±½ degree
General Machine Department Notes
Break all sharp edges.
Grind faces perpendicular to bore.
All machined surfaces are to be concentric, square, parallel or flat within 0.0005 T.I.R.
Keyways are to be symmetrical to and within ±0.001.
Note, all tapped holes G.H.-11 for H.T.

For FIGS. 28-31, 35-41 and 43-46, in general, note the following (dimensions in inches, and so forth) in addition to the formulae for use with FIG. 28 (A=(LEAD/360)+(LEAD×TPC); and B=(LEAD×(TPC+2))+SHIFT):
Ball Nut Data
Diameter: 2.25
Lead: 0.500
Hand: Right Hand
Start: 1
Ball Diameter: 0.375
Radius (Finished): 0.195
Helix: 3-degree, 54'
Root Diameter (Finished): 2.7131
   Tolerances
   Fractions ±1/64
   Two-place decimal: ±0.010
   Three-place decimal: ±0.005
   Four-place decimal: ±0.0005
   Angles: ±½ degree General Machine Department Notes
Flange to #.
Break all sharp edges.
Lock Nut # Typ.
Grind faces perpendicular to bore.
All machined surfaces are to be concentric, square, parallel or flat within 0.0005 T.I.R.
Keyways are to be symmetrical to and within ±0.001.
For FIGS. 47-66, in general, note as follows (dimensions in inches, and so forth):
Ball Nut Data
Diameter: 1.969
Lead: 0.6299
Hand: Right Hand
Start: 1
Ball Diameter: 0.281
Radius (RGH): 0.132
Radius (finished): 0.146
Helix: 5-degree, 39'
Root Diameter (RGH): 2.2914
Root Diameter (Finished): 2.3164
T.P.C.: 4
P.U. Angle: 45-degree angle
S/P: 0.0098
  Tolerances
    Fractions ±1/64
  Two-place decimal: ±0.010
  Three-place decimal: ±0.005
  Four-place decimal: ±0.0005
  Angles: ±½ A degree
General Machine Department Notes
Break all sharp edges.
Grind faces perpendicular to bore.
All machined surfaces are to be concentric, square, parallel or flat within 0.0005 T.I.R.
Keyways are to be symmetrical to and within ±0.001.
Note, all tapped holes G.H.-11 for H.T.

CONCLUSION TO THE INVENTION

The instant invention is thus provided. Various feature(s), part(s), step(s), subcombination(s) and/or combination(s) may be employed with or without reference to other feature(s), part(s), step(s), subcombination(s) and/or combination(s) in the practice of the invention, and numerous adaptations and modifications can be effected within its spirit, the literal claim scope of which is particularly pointed out as follows:

What is claimed is:

1. A device including a double nut for a ball screw unit having a main axis defining a main axial direction along a ball screw part of the unit, which can be adjusted to regulate tension between the double nut and the ball screw with their ball bearings, which comprises:
   the double nut, which generally encircles the main axis and is spaced annularly therealong to define a length, and which has two main parts, a first ball nut part and a second ball nut part, each of which having a housing with an internal face that confronts the internal face of the other housing, and internal race portions, which are in an initial position relative to one another and which correspond to external race portions of the ball screw part, which is for receiving a set of ball bearings, with the two main parts connected to each other, at least indirectly, such that the internally confronting faces of the housings touch one another when the double nut is assembled with the ball screw part and ball bearings to provide the ball screw unit; and
   an adjustment mechanism, which can be accessed from an external end of the double nut and/or be self-adjusting, and which can transmit force from a first location of the double nut that is in the first ball nut part to a second location of the double nut that is in the second ball nut part, thus spaced apart lengthwise from the first location, into a force inclusive of a force applicable at a position radially spaced apart from the main axis and generally orthogonal relative to a plane in which the main axis lies so that, when appropriate, the internal race portions of the at least two parts can be moved into an adjusted position different from the initial position relative to one another, wherein:
   the adjustment mechanism generally lies in the plane in which the main axis lies;
   the force from the first location of the double nut that is in the first ball nut part to the second location of the double nut that is in the second ball nut part, thus spaced apart lengthwise from the first location, includes force applied along the main axial direction; and
   the force inclusive of the force applicable at the position radially spaced apart from the main axis and generally orthogonal relative to the plane in which the main axis lies causes rotation of the second ball nut part with respect to the first ball nut part.

2. The device of claim 1, which can be accessed from an external end of the double nut to be adjustable thereat and thereby.

3. The device of claim 1, which is self-adjusting.

4. The device of claim 1, wherein the adjustment mechanism includes a resilient preload feature or part for maintaining preload.

5. The device of claim 1, wherein the adjustment mechanism includes:
   a rod that is movable at least axially with respect to the double nut and originating in a first housing of the at least two parts of the double nut, which has an angled or beveled part that cooperates with a wedge in a second housing of the at least two parts of the double nut; and
   a resilient preload feature or part for maintaining preload.

6. The device of claim 5, wherein the rod is of one piece, and the resilient preload feature or part for maintaining preload includes a spring.

7. The device of claim 5, wherein the rod embraces a multi-piece rod including a first rod piece and a second rod piece; and the resilient preload feature or part for maintaining preload includes a compression spring that is interposed between the first rod piece and the second rod piece.

8. The device of claim 1, wherein a wiping contrivance is present, which embraces a wiping member in generally annular form that can be placed to closely fit and guard a space between the nut and screw in threaded ball-including combination with the nut.

9. The device of claim 8, wherein the adjustment mechanism includes a resilient preload feature or part for maintaining preload.

10. The device of claim 1, wherein a depending foot, ball bearing return is present.

11. The device of claim 1, which further comprises the ball screw and the ball bearings to provide the ball screw unit.

12. The device of claim 11, which further comprises machinery into which the ball screw unit is installed.

13. In combination, a device comprising a ball screw unit, which embraces a ball screw nut, a ball screw, and ball bearings, in threaded assembly; and a wiping contrivance, which includes a felt wiping member:

that is made from felt in an elongate rope shape having a substantially circular cross-section designating a central line extending along the elongate rope shape perpendicular to and through the substantially circular cross-section and having spaced apart, substantially circular ends, with the felt in the elongate rope shape disposed in an annular form about a circumference of the ball screw nut and the ball screw that the felt wiping member is intended to protect such that the central line extending along the elongate rope shape perpendicular to and through the substantially circular cross-section encircles a main axis along the ball screw and the substantially circular ends confront one another to make a donut shape; and that can be and is placed to closely fit and guard a space between the ball screw nut and the ball screw in threaded ball-including assembly therewith.

14. The combination of claim 13, wherein a support member is part of a housing of the ball screw nut about an external end thereof, with a groove to hold the felt wiping member in place thereabout.

15. The combination of claim 14, wherein the ball screw nut is a double nut, which has a first housing and a second housing, and the support member is about external ends of the first and second housings, each of which each having the groove to hold the felt wiping member in place thereabout.

16. The combination of claim 13, which further comprises machinery into which said device with said wiping contrivance is installed.

17. A device including a double nut for a ball screw unit having a main axis along a ball screw part of the unit, which can be adjusted to regulate tension between the double nut and the ball screw with their ball bearings, which comprises:

the double nut, which generally encircles the main axis and is spaced annularly therealong to define a length, and which has at least two parts, each of which having a housing and internal race portions in an initial position relative to one another and which correspond to external race portions of the ball screw part, which is for receiving a set of ball bearings, with the at least two parts connected to each other, at least indirectly; and an adjustment mechanism, which can be accessed from an external end of the double nut and/or be self-adjusting; which can transmit force from a first location of the double nut to a second location of the double nut spaced apart lengthwise from the first location, into a force inclusive of a force applicable at a position radially spaced apart from the main axis and generally orthogonal relative to a plane in which the main axis lies so that, when appropriate, the internal race portions of the at least two parts can be moved into an adjusted position different from the initial position relative to one another; and which includes two adjustment sets, a first adjustment set and a second adjustment set, both of which including a rod movable at least axially with respect to the double nut and originating in a first housing of the at least two parts of the double nut, which has an angled or beveled part that cooperates with a wedge in a second housing of the at least two parts of the double nut, generally with the first adjustment set and the second adjustment set opposing one another relative to and lying in the plane in which the main axis lies, wherein the force inclusive of the force applicable at the position radially spaced apart from the main axis and generally orthogonal relative to the plane in which the main axis lies that can be transmitted by the first adjustment set is directed in a first direction, and the force inclusive of the force applicable at the position radially spaced apart from the main axis and generally orthogonal relative to the plane in which the main axis lies that can be transmitted by the second adjustment set is directed in a second direction generally opposite to the first direction.

18. The device of claim 17, wherein the adjustment mechanism of each of the first adjustment set and the second adjustment set embraces a rod that is movable at least axially with respect to the double nut and originating in a first housing of the at least two parts of the double nut, which has an angled or beveled part that cooperates with a wedge in a second housing of the at least two parts of the double nut; and the adjustment mechanism includes a resilient preload feature or part for maintaining preload, which includes a spring.

19. The device of claim 17, wherein at least one of the following features (A, B) is present:

(A) a depending foot, ball bearing return, in the ball screw unit; and (B) a wiping contrivance, which embraces a felt wiping member made from felt in an elongate shape having a substantially circular cross-section and disposed in generally annular form about or slightly more than a circumference of the ball screw double nut and the ball screw that the felt wiping member is intended to protect, which can be and is placed to closely fit and guard a space between the ball screw double nut and the ball screw in threaded ball-including assembly therewith, with a support member about external ends of each of the two housings of the ball screw double nut and a groove in each of the two housings of the ball screw double nut to hold the felt wiping member in place thereabout.

20. The device of claim 17, wherein the adjustment mechanism includes a resilient preload feature or part for maintaining preload.

21. The device of claim 17, which further comprises machinery into which the ball screw unit is installed.

22. A device including a double nut for a ball screw unit having a main axis defining a main axial direction along a ball screw part of the unit, which comprises:

two main parts of the double nut, a first nut and an associated second nut, each nut encircling the main axis, having an internal race for ball bearings that correspond to an external race of the ball screw part, and having an internal face that confronts the internal face of the other nut such that the internally confronting faces of the housings touch one another when the two main parts of the double nut are assembled with the ball screw part and ball bearings to provide the ball screw unit; and an adjustment mechanism that can transmit a force from the first nut to the second nut generally in the main axial direction, which can be converted into a rotational force such that the second nut can be rotated about the main axis with respect to the first nut.

23. The device of claim 22, which is self-adjusting.

24. The device of claim 22, wherein the adjustment mechanism includes a resilient preload feature or part for maintaining preload.

25. The device of claim 22, which can be accessed from an external end of the first nut so that the double nut can be adjustable thereat and thereby.

26. The device of claim 25, wherein the adjustment mechanism can also transmit or relieve force generally in a direction opposite the main axial direction.

27. The device of claim 26, wherein the adjustment mechanism includes a screw accessible from the external end of the first nut.

28. The device of claim 22, which further comprises the ball screw and ball bearings to provide the ball screw unit.

29. The device of claim 28, which further comprises machinery into which the ball screw unit is installed.

* * * * *